(12) United States Patent
Bennett et al.

(10) Patent No.: US 6,345,302 B1
(45) Date of Patent: *Feb. 5, 2002

(54) SYSTEM FOR TRANSMITTING AND RECEIVING DATA WITHIN A RELIABLE COMMUNICATIONS PROTOCOL BY CONCURRENTLY PROCESSING PORTIONS OF THE PROTOCOL SUITE

(75) Inventors: Toby D. Bennett, Adelphi; Donald J. Davis, Severn; Jonathan C. Harris, Crofton; Ian D. Miller, Columbia, all of MD (US)

(73) Assignee: TSI TelSys, Inc., Columbia, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/641,762

(22) Filed: Aug. 21, 2000

Related U.S. Application Data

(63) Continuation of application No. 08/960,837, filed on Oct. 30, 1997, now Pat. No. 6,122,670.

(51) Int. Cl.[7] .............................................. G06F 15/16
(52) U.S. Cl. ...................... 709/236; 709/230; 709/238; 709/242; 709/243; 709/250
(58) Field of Search ............................... 709/236, 222, 709/230, 238, 242, 243, 250

(56) References Cited

U.S. PATENT DOCUMENTS

| | | | | |
|---|---|---|---|---|
| 4,451,827 A | | 5/1984 | Kahn et al. ............ | 340/825.52 |
| 4,550,402 A | | 10/1985 | Gable et al. .................. | 370/85 |
| 5,418,781 A | * | 5/1995 | Kaufman et al. ............ | 370/413 |
| 5,430,842 A | * | 7/1995 | Thompson et al. ......... | 709/236 |
| 5,497,371 A | * | 3/1996 | Ellis et al. ................... | 370/412 |
| 5,596,723 A | * | 1/1997 | Romohr ....................... | 709/222 |
| 5,884,025 A | | 3/1999 | Baehr et al. ........... | 395/187.01 |
| 5,909,686 A | | 6/1999 | Muller et al. ................ | 707/104 |
| 5,940,598 A | * | 8/1999 | Strauss et al. .............. | 370/466 |
| 6,122,670 A | * | 9/2000 | Bennett et al. ............. | 709/236 |
| 6,147,993 A | * | 11/2000 | Kloth et al. ................. | 370/392 |

OTHER PUBLICATIONS

Stevens, Richard W., "TCP/IP Illustrated", vol. 1, The protocols, 1994.*

* cited by examiner

*Primary Examiner*—John A. Follansbee
*Assistant Examiner*—Nabil El-Hady
(74) *Attorney, Agent, or Firm*—Venable; James R. Burdett

(57) ABSTRACT

A system and method for sending and receiving data with a reliable communication protocol. The system includes a computer at a node having a backplane, a CPU board plugged into the backplane, software instructions for the CPU, and a special network board plugged into the backplane. The CPU board, software, and network card act to implement the TCP/IP protocol suite. The network card or board includes an interface to receive data packets from the physical layer, and circuitry to verify the TCP checksum before de-encapsulation and routing of the TCP segment by the network layer software. It also includes circuitry to automatically prepare the acknowledgement signal to be sent by the receiving computer to the sending computer. It additionally includes circuitry to calculate the error detecting code on outgoing signals from the sending computer to the receiving computer.

60 Claims, 27 Drawing Sheets

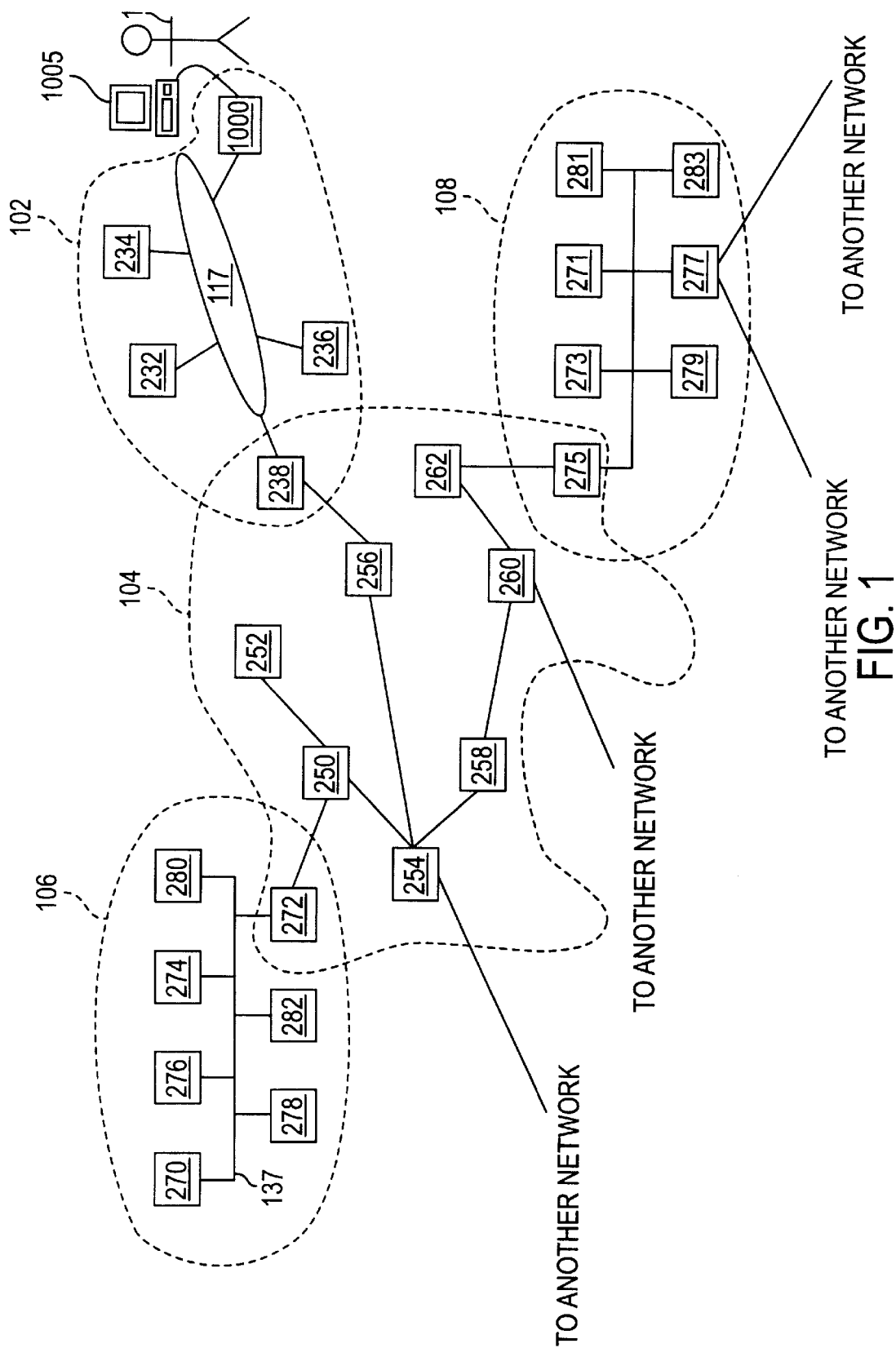

SYSTEM FOR TRANSMITTING AND RECEIVING DATA WITHIN A RELIABLE COMMUNICATIONS PROTOCOL BY CONCURRENTLY PROCESSING PORTIONS OF THE PROTOCOL SUITE

RELATED APPLICATIONS

A continuation of Application Ser. No. 08/960,837 filed Oct. 30, 1999, entitled "APPARATUS AND METHOD FOR CONSTRUCTING DATA FOR TRANSMISSION WITHIN A RELIABLE COMMUNICATION PROTOCOL BY PERFORMING PORTIONS OF THE PROTOCOL SUITE CONCURRENTLY", By Toby Bennett, Donald J. Davis, Jonathan C. Harris, Ian D. Miller, now U.S. Pat. No. 6,122,670 issued Sep. 19, 2000.

Concurrently submitted application for:

"APPARATUS AND METHOD FOR RECEIVING DATA WITH A RELIABLE COMMUNICATION PROTOCOL", Ser. No. 08/960,836, by TOBY D. BENNETT, DONALD J. DAVIS, JONATHAN C. HARRIS, and IAN D. MILLER now abandoned.

Concurrently submitted application for: "APPARATUS AND METHOD FOR TRANSMITTING DATA WITH A RELIABLE COMMUNICATION PROTOCOL", Ser. No. 08/960,960, by TOBY D. BENNETT, DONALD J. DAVIS, JONATHAN C. HARRIS, and IAN D. MILLER now abandoned.

DESCRIPTION

1. FIELD OF THE INVENTION

This invention relates generally to computer networks and, more particularly, to an improved system and method of constructing data packets for transmission between computers in a system of computer networks.

2. BACKGROUND OF THE INVENTION

A computer network includes multiple computers connected with a physical medium, such as a cable. Data sent from a source computer to a destination computer may be lost or changed because of congestion or noise in the network. Schemes exist to transmit data using a protocol that is "reliable," meaning that the protocol guarantees accurate delivery of transmitted data. Operating a reliable communication protocol, however, has entailed substantial overhead in the network computers.

More particularly, approaches exist for improving the performance of a computer's implementation of a reliable communication protocol. For example, a technique exists for performing one aspect of a common protocol suite (TCP/IP) in hardware. Request for Comment (RFC) 1936, "Implementing the Internet Checksum in Hardware," describes a technique for performing a calculation in hardware that is required by various communication protocols.

In addition, approaches exist which combine the calculations described above with additional hardware to efficiently handle interrupts. One such approach, described in the white paper, "Next Generation Adapter Design and Optimization for Gigabit Ethernet" by Alteon Networks, involves handling multiple communication protocol interrupts in hardware. This alleviates the need for the main computer processor to handle multiple interrupts.

SUMMARY OF THE INVENTION

It is an object of the present invention to provide an improved method and apparatus for efficiently operating a reliable communication protocol in a computer network. In particular, the present invention provides an improved method and apparatus for constructing a portion of an acknowledgement signal to be sent upon successful receipt of an incoming signal.

In accordance with the preferred embodiment of the present invention, a protocol processing subsystem receives data from another computer in a computer network. Upon successful receipt of the data, the protocol calls for construction of an acknowledgement signal to be sent from the receiving computer to the sending computer. The protocol processing subsystem of the present invention automatically constructs this acknowledgement signal. In the preferred embodiment, the construction of this acknowledgement signal occurs in hardware which alleviates the need for the protocol processing software to construct the acknowledgement signal. This results in a significant improvement in system performance over systems according to the prior art.

BRIEF DESCRIPTION OF THE DRAWINGS

FIG. 1 is a diagram of a system of computer networks containing the preferred embodiment of the present invention.

Figure 2A:
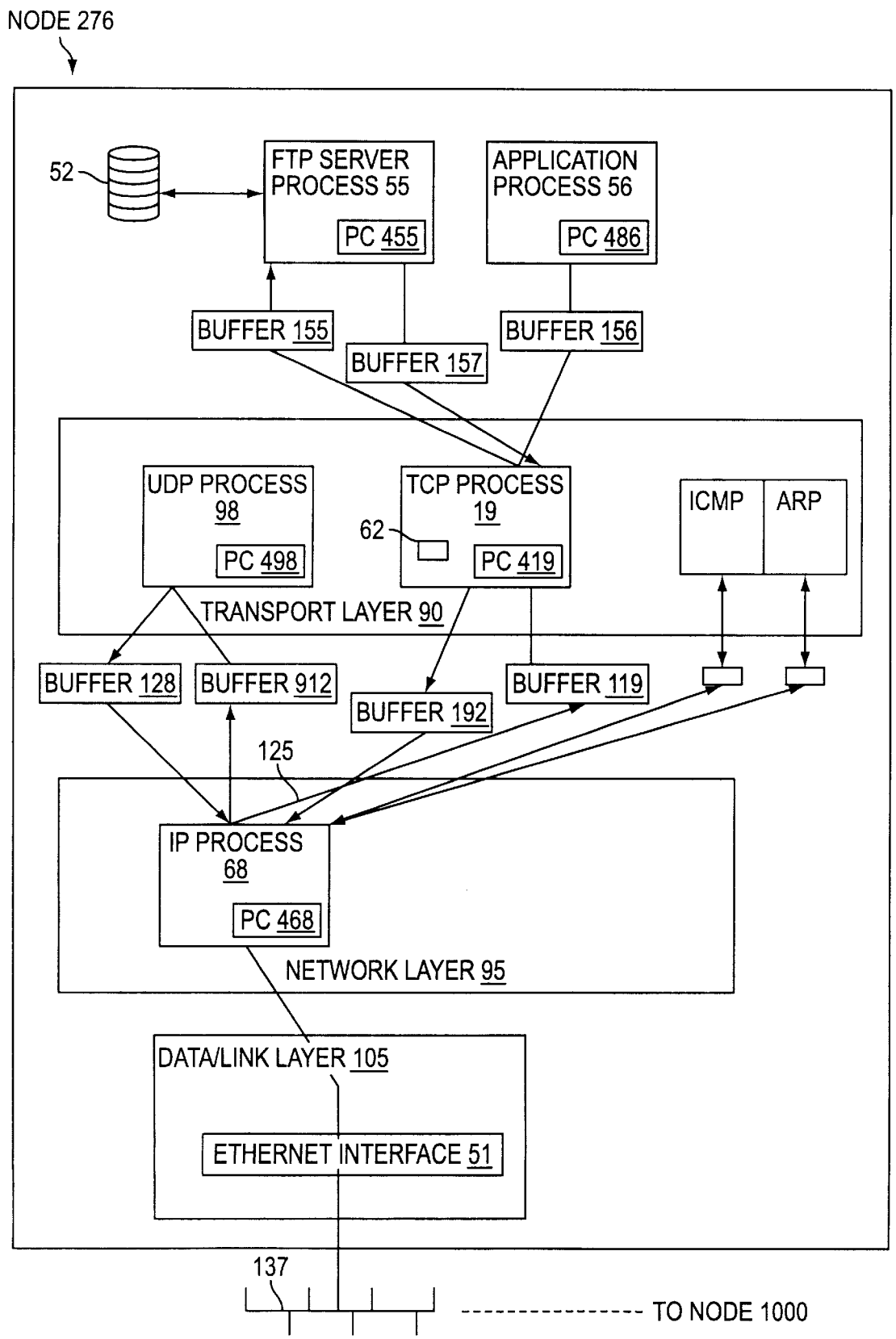
FIGS. 2A and 2B are functional block diagrams showing the network architecture of two of the nodes shown in FIG. 1.

The accompanying drawings which are incorporated in and which constitute a part of this specification, illustrate embodiments of the invention and, together with the description, explain the principles of the invention, and additional advantages thereof. Throughout the drawings, corresponding parts are labeled with corresponding reference numbers.

A. System architecture

1. Network description

FIG. 1 shows a system of computer networks 102, 104, 106, and 108 according to a preferred embodiment of the present invention. Person 1 is a researcher working at workstation terminal 1005 in New York. Terminal 1005 is connected to local node 1000, which constitutes a node in computer network 102. Person 1 needs to use research information stored on computer 276 at a university in Berkeley, Calif. Computer 276 constitutes a node on network 106.

Network 102 is a local area network (LAN) including computers at nodes 1000, 232, 234, 238, and 236. Network 104 is a wide area network (WAN) including computers at nodes 275, 238. 254, 250, 252, 258, 256, 260, 262, and 272. Network 106 is a LAN including computers at nodes 270, 272, 274, 280, 278, 276, and 282. Network 108 is a LAN including computers at nodes 271, 273, 275, 281, 279, 277, and 283.

University computer at node 276 sends data to local node 1000 by way of networks 106, 104, and 102. More specifically, university computer at node 276 sends data to local node 1000 by way of an Ethernet cable 137, computers 272, 250, 254, 256, 238, and Asynchronous Transfer Mode (ATM) switches 117.

Each computer shown in FIG. 1 includes the TCP/IP protocol stack, defined in the RFC documents and described, for example, in Comer, Douglas E. [1991] *Internetworking with TCP/IP, Volume 1, Principles, Protocols, and Architecture*, Prentice-Hall, Englewood Cliffs, N.J. Thus, the preferred system is directed to TCP segments (RFC 793) embedded in IP datagrams (RFC 791).

In a typical implementation of a TCP/IP protocol stack, the various processes are performed sequentially in software by the main processor. This prevents the main processor from being available to execute other tasks. The preferred system, comprising a protocol logic subsystem, coalesces numerous operations from the various protocols which speed up the overall system processing and free up the main processor to perform other tasks. In the system described herein, the university computer comprises a standard implementation while the researcher's computer (the local node) comprises a computer containing a system according to the present invention.

Computer at node 272 has an address on both LAN 106 and WAN 104, meaning that computer at node 272 has circuitry for sending or receiving a network-106-formatted packet sent over network 106, and circuitry for sending or receiving a network-104-formatted packet sent over network 104. Thus, the computer at node 272 acts to route IP datagrams between networks 106 and 104.

Computer at node 238 has an address on both WAN 104 and LAN 102 and, therefore, the computer at node 238 acts to route packets between networks 104 and 102.

2. Remote node description

Figure 2B:
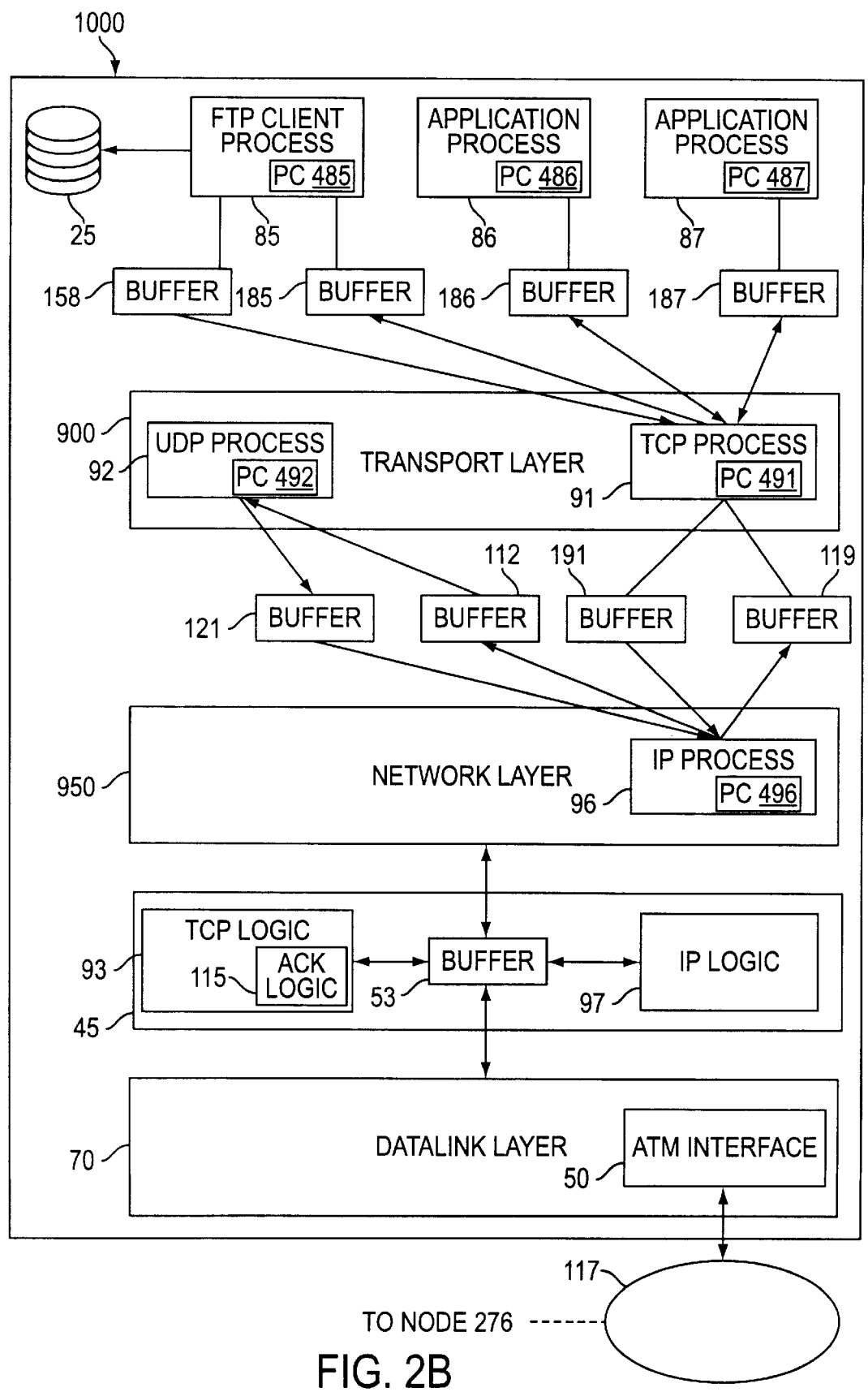

FIGS. 2A and 2B depict the functional architecture for network communications between local node 1000 and remote node 276. In remote node 276 (FIG. 2A) transport layer 90 includes TCP process 19 to implement the TCP protocol. Network layer 95 includes IP process 68 to implement the IP protocol. Data link layer 105 includes an Ethernet interface chip 51 for interfacing to the physical layer, including Ethernet cable 137.

3. Local node description

In local node 1000, depicted in FIG. 2B, the combined functionality of TCP process 91, TCP logic 93, IP process 96, and IP logic 97 implements the well known and understood TCP and IP protocols defined in the RFC documents including RFC 793 and RFC 791. As is well known, such RFCs document Internet standards, and are administered by Internic.

Each of application process 86, FTP client process 85, application process 87, UDP processe 92, TCP process 91, and IP process 96 includes a respective plurality of instructions, sequentially fetched and executed by CPU 10 (shown in FIG. 3), and a respective program counter (PC) indicating a next instruction to be executed by CPU 10. As shown in FIG. 2B, application process 86 includes PC 486, FTP client process 85 includes PC 485, application process 87 includes PC 487, UDP process 92 includes PC 492, TCP process 91 includes PC 491, and IP process 96 includes PC 496. Note that TCP process 91 and IP process 96 perform only those portions of the respective protocols which are not processed by TCP logic 93 and IP logic 97.

Each of processes 91, 85, 86, 87, 92, and 96 runs in its own address space, meaning that a certain virtual address in one of the processes accesses a different memory location than the same virtual addresses in another one of the processes. Although processes may share physical copies of instructions, such as operating system instructions, each process is essentially a computation that proceeds independently of other processes.

A single CPU 10 may execute each of these processes essentially concurrently, by using a time sharing scheme, in which CPU 10 executes one process for a time, ceases execution of the process, saves the current PC and other state information for the process, then restores state and resumes execution of a previously saved process at the instruction indicated by the saved PC of the previously saved process.

In local node 1000 transport layer 900 includes TCP process 91 which is executed by CPU 10. TCP process 91 includes a plurality of instructions, sequentially fetched and executed by CPU 10, and a program counter (PC) 491 indicating a next instruction to be executed in TCP process 91. TCP process 91 includes instructions for sending data to File Transfer Protocol (FTP) client process 85, via buffer 185, and also for receiving data from FTP client process 85 via buffer 158.

Figure 4:
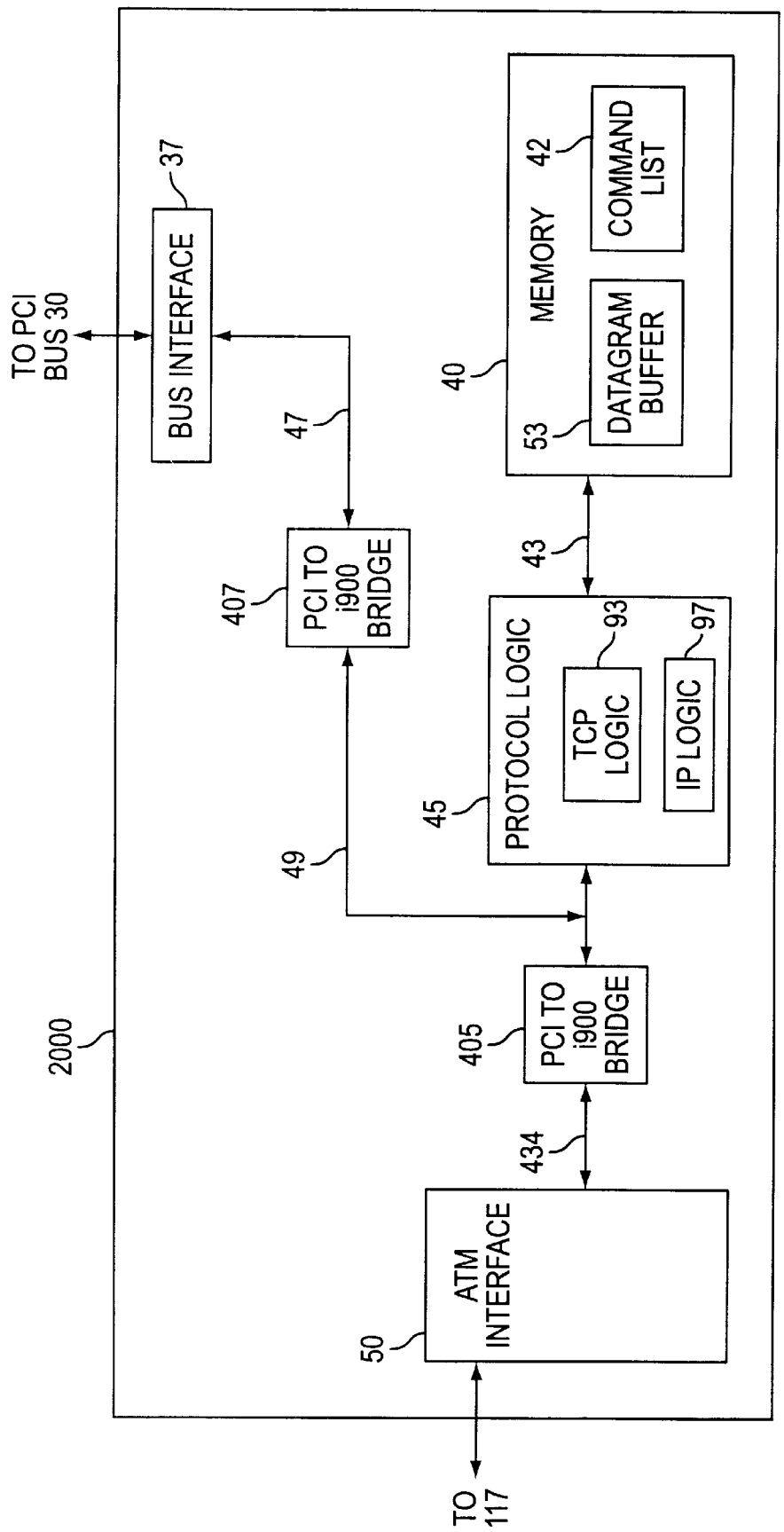
FIG. 4 is an architectural block diagram of one of the circuit assemblies shown in FIG. 3.

A portion of the processing of the transport layer occurs in TCP logic 93, which is part of protocol logic subsystem 45 on network card 2000 (FIG. 4). TCP logic 93 includes acknowledgment (ACK) logic 115, allowing TCP processing in local node 1000 to generate an ACK segment (a TCP segment containing a set ACK flag in the TCP header).

Also in local node 1000, network layer 950 includes IP process 96. IP process 96 is executed by CPU 10. IP process 96 includes instructions for sending data to TCP process 91 via TCP input buffer 119 (or to UDP process 92 via buffer 112) as specified by the protocol field in the IP header. IP process 96 may also receive data, for example from TCP process 91 via buffer 191 (or from other processes, e.g. UDP process 92).

IP logic 97 is part of protocol logic subsystem 45 on network card 2000. Similar to the processing of TCP, a portion of the IP processing also occurs in the protocol logic subsystem 45, specifically in IP logic 97.

Figure 3:
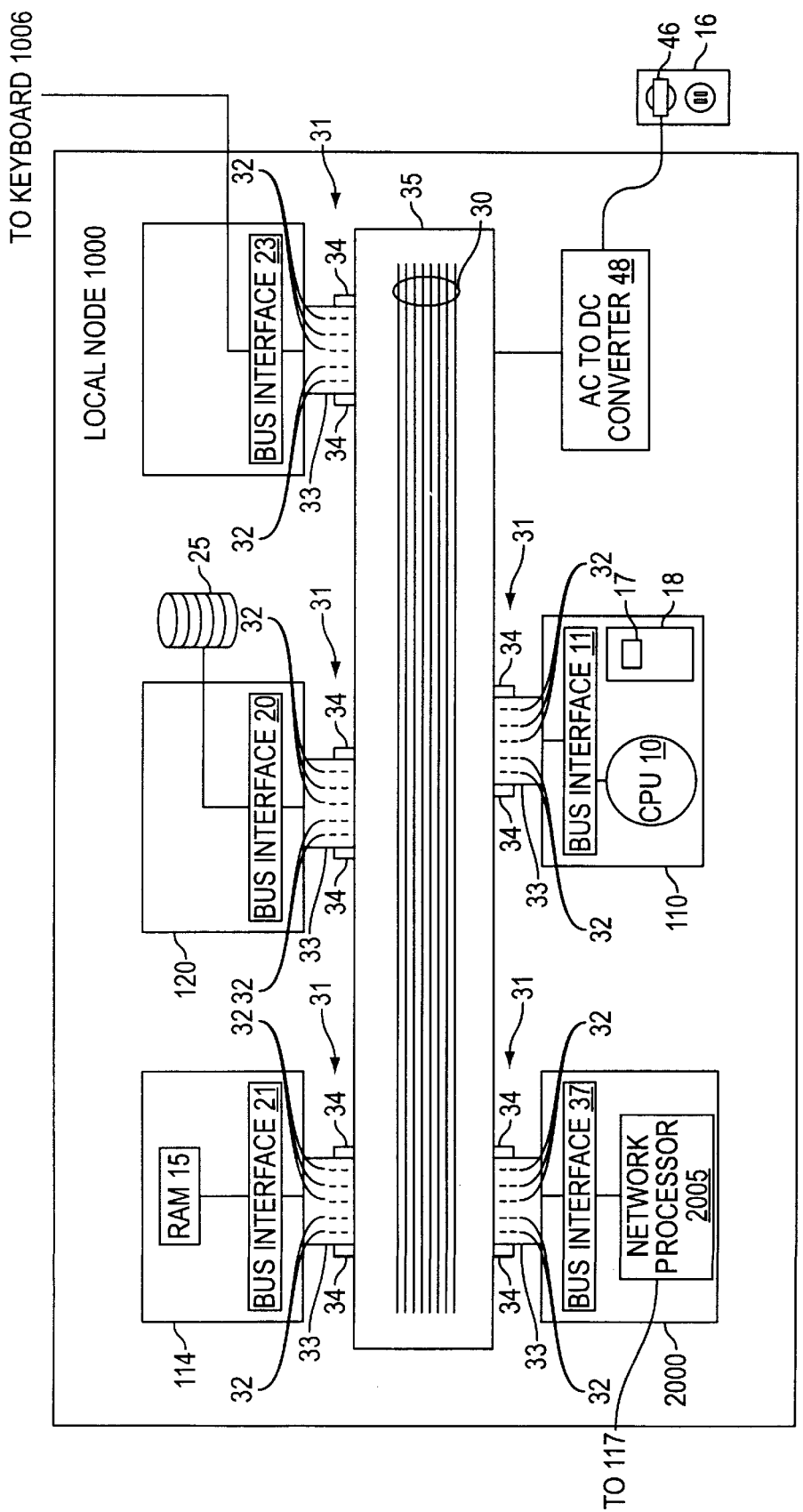
FIG. 3 is an architectural block diagram of a computer constituting one of the network nodes shown in FIG. 1.

FIG. 3 shows local node 1000 including housing 1002. Housing 1002 encloses CPU card 110, random access memory (RAM) card 114, magnetic disk memory 25, disk controller card 120, network card 2000, AC-DC converter 48, and mechanical backplane 35. Mechanical backplane 35 includes a PCI signal bus 30 which, in turn, includes a plurality of parallel address lines and a plurality of parallel data lines.

AC-DC converter 48 is plugged into 60 Hz wall socket 16 via plug 46. Converter 48 receives the 60 Hz power signal from socket 16, converts the 60 Hz power signal to a DC power signal, and sends the DC power signal to each of the boards shown in FIG. 3, via mechanical backplane 35. CPU card 110, RAM card 114, disk controller card 120, and network card 2000, are each connected to mechanical backplane 35 via a respective connector 31. Each connector 31 includes a plastic, insulating housing 33 enclosing and supporting a plurality of parallel conductors 32 for electrically coupling PCI bus 30 to bus interface circuitry 11, 20, 21, 23 and 37 on a respective board. Screws 34 on cards 110, 114, and 120 engage respective screw holes in mechanical backplane 35, to secure the connector and respective board to mechanical backplane 35. Thus, each of cards 114, 120, 110, and 2000 is removably connected to mechanical backplane 35.

Network card 2000 comprises an Adaptive Computing Engine (ACE) card in accordance with the preferred embodiment of the present invention, and includes bus interface circuitry 37 for recognizing the bus address of card 2000, and network processor 2005 for communicating between switches 117 and PCI bus 30 via bus interface circuitry 37. Network processor 2005 includes an ATM network interface chip 50 (show in FIG. 4) connected to ATM switches 117, and logic for performing portions of the TCP protocol and IP protocol processing. It is presently preferred that the protocol logic subsystem 45 includes a Xilinx 6200 family field programmable gate array (FPGA), and programming data for the array.

CPU card 110 and network card 2000 combine to implement the entire TCP/IP protocol suite within local node 1000. Network card 2000 concurrently processes parts of both the TCP and IP protocols. This coalescing of TCP and IP processing, performed in a reconfigurable protocol logic subsystem 45 in the preferred embodiment, provides significant improvement over the prior art. The use of reconfigurable hardware logic significantly accelerates the process, and it frees up the main processing system (i.e. CPU card 110) to perform other tasks.

CPU 10 on CPU card 110 executes the operating system 17 from RAM 18. CPU 10 and operating system 17 act to execute a plurality of processes in time-shared fashion. Various parts of operating system 17 may be transferred between RAM 18 and disk memory 25 using a virtual memory mapping scheme, as is well known in the art.

Bus interface circuitry 37 is responsive to a signal on the address lines of PCI bus 30. Bus interface circuitry 37 acts to recognize the PCI bus address of network card 2000. Disk controller card 120 includes bus interface circuitry 20, responsive to the signal on the address lines of PCI bus 30, for recognizing the PCI bus address of disk controller card 120, which is different from the PCI bus address of card 2000. RAM card 114 includes bus interface circuitry 21 responsive to the signal on the address lines of PCI bus 30, for recognizing the PCI bus address of RAM card 114, which is different from the PCI bus address of above disk controller card 120 and network card 2000. CPU card 110 includes bus interface circuitry 11 for sending a signal to the address lines of PCI bus 30.

FIG. 4 is an architectural diagram of network card 2000, contained within local node 1000. Network card 2000 includes bus interface circuitry 37, memory 40, protocol logic subsystem 45, and ATM network interface chip 50. Memory 40 stores command list 42, which acts as a buffer both for TCP ACK commands and for a disposition queue of datagrams which are pending and need to be transferred to the host, for further processing. Similarly memory 40 maintains a queue of pointers to datagrams which need to be transferred to the ATM network interface chip 50. Memory 40 buffers the commands sent from CPU board 110 to network card 2000, as described in more detail below. Protocol logic subsystem 45 includes TCP logic 93 for implementing certain functions of the TCP protocol, and IP logic 97 for implementing certain functions of the IP protocol, as described in more detail below.

ATM network interface chip 50 interfaces to the physical layer; ATM network interface chip 50 receives and sends packets of data from and to ATM switches 117. When receiving a packet, ATM network interface 50 performs ATM packet reassembly which is a well known process to recreate the original structure of the IP datagram or datagram fragment, and writes the received datagram or datagram fragment into datagram buffer 53 via bus 934, PCI bridge 405, bus 49, protocol logic 45, and bus 43. During this writing process, protocol logic subsystem 45 monitors bus 49 to sum selected words in the datagram being transferred to datagram buffer 53. Thus, protocol logic subsystem 45 verifies that the IP header checksum result is correct, and verifies that the TCP segment checksum is correct, before sending the datagram to IP process 96, via bus 43, protocol logic 45, bus 49, i900 bridge 407, bus 47, bus interface 37, and PCI bus 30. If either the IP header checksum or the TCP segment checksum results are incorrect, protocol logic subsystem 45 discards the datagram (does not send the datagram to PCI bus 30).

4. Datagram description

Figure 5:
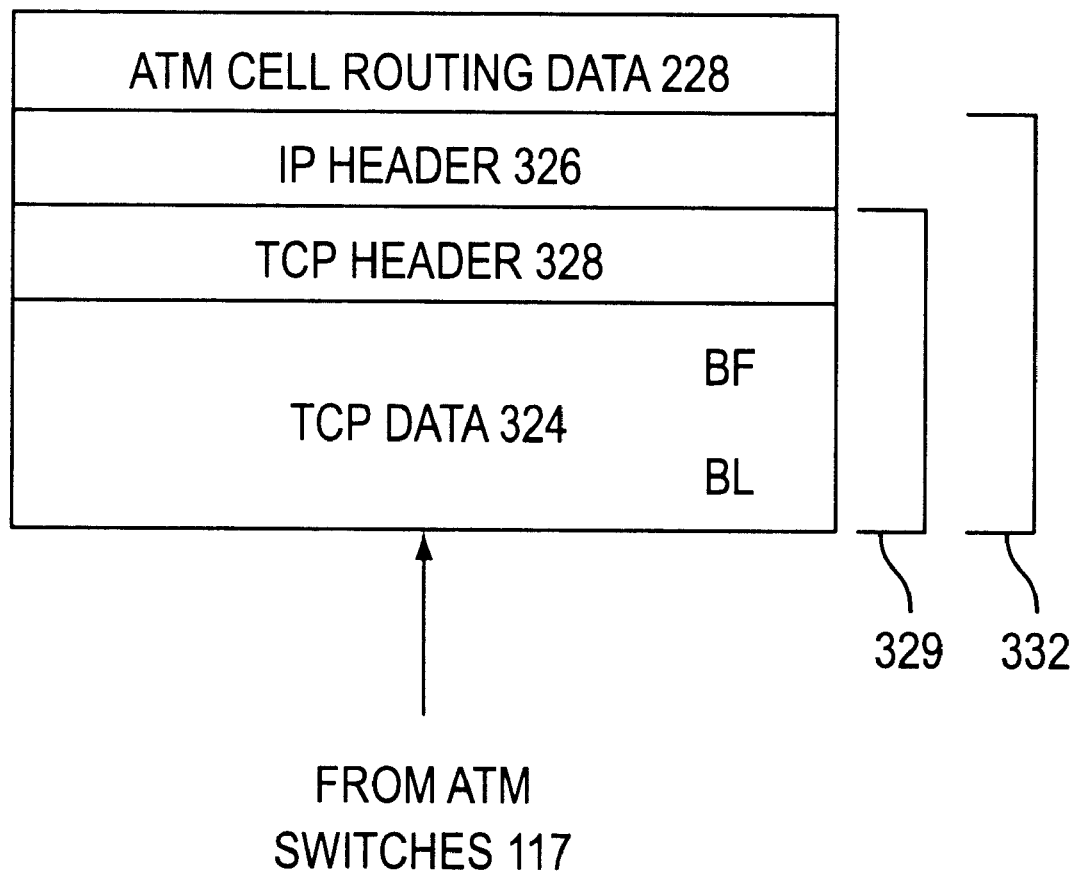
FIG. 5 depicts the general structure of a datagram embedded in the physical layer protocol.
Figure 7:
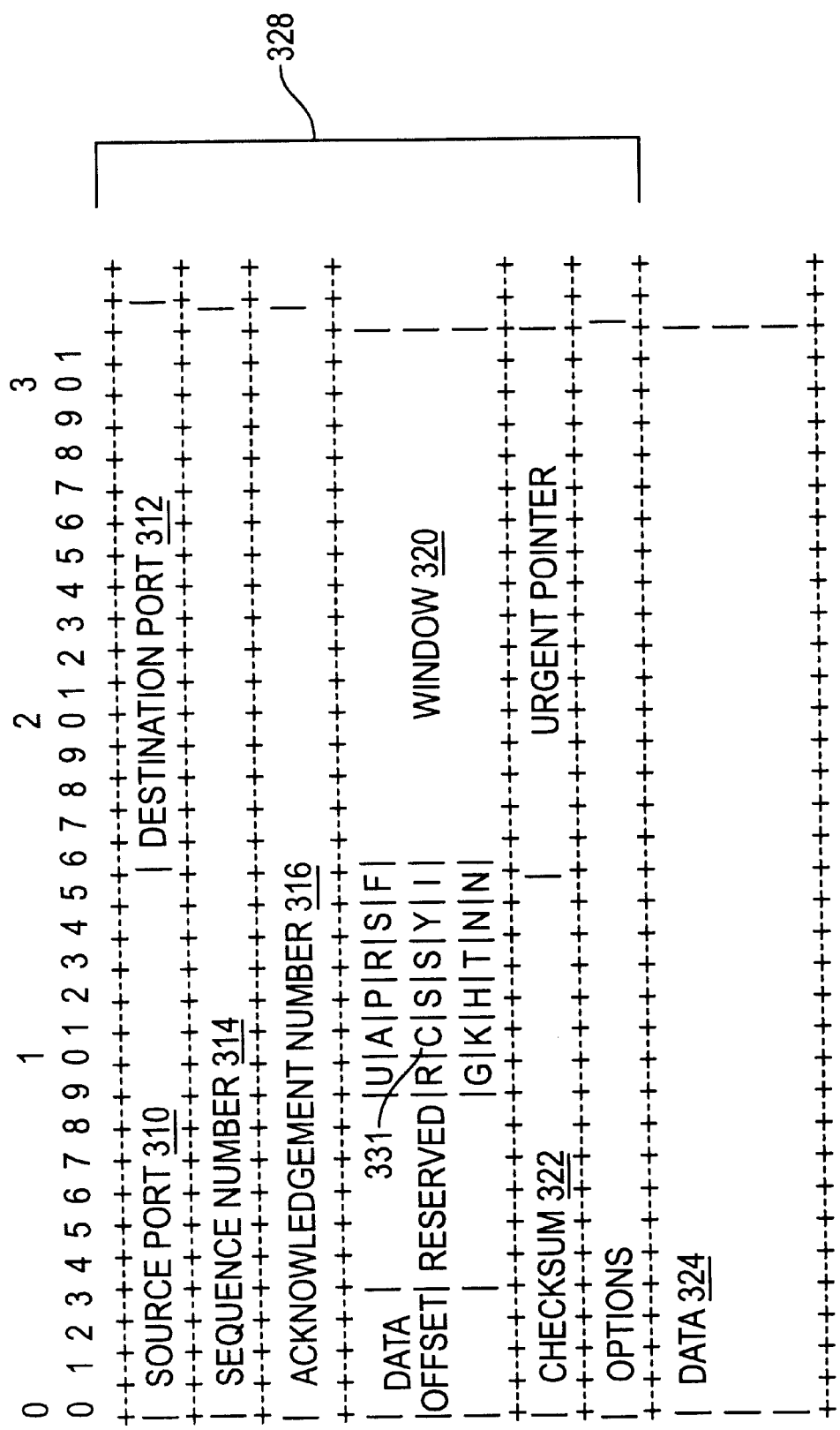
FIG. 7 depicts the header format of the TCP segment in FIG. 5.

Packets of information known as datagrams embody the information exchanged between local node 1000 and remote node 276. A datagram embedded in an ATM cell is depicted in FIG. 5. Datagram 332 is essentially a network signal with a first header (IP header 326) and a first data area (IP data 329, which comprises a TCP segment). The first data area has a second header (TCP header 328) and a second data area (TCP data area 324 shown in FIG. 7 as part of TCP header 328). Datagram 332 contains an error detecting code (TCP checksum 322) in the second header which is a function of the second header, the second data area, and selected parts of the first header (those selected parts being known as the pseudo header, shown in FIG. 8).

Figure 6:
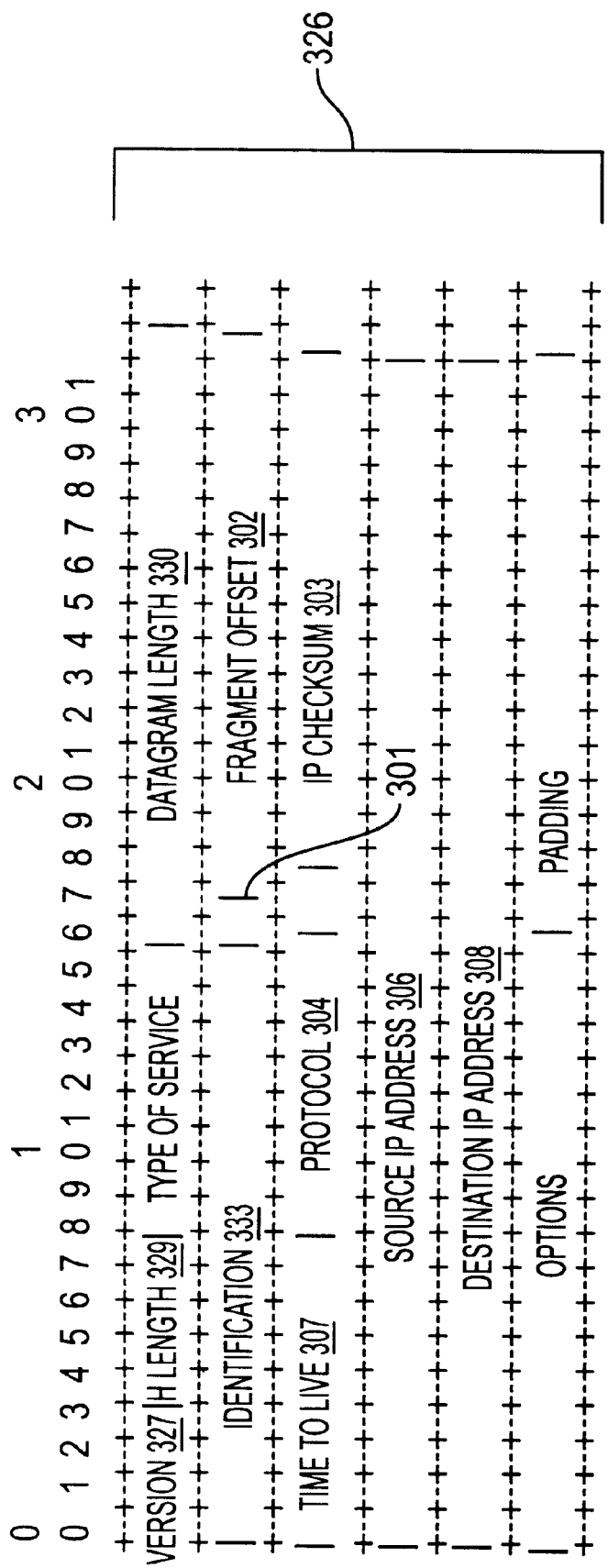
FIG. 6 depicts the header format of the datagram shown in FIG. 5.

FIG. 6 further refines the datagram structure. For a datagram being sent from remote node 276 to local node 1000, in IP header 326 source IP address field 306 is the Internet address of Ethernet interface 51 in remote node 276 and destination IP address field 308 is the Internet address of ATM network interface chip 50 in local node 1000. Protocol field 304 is six, because datagram 332 contains a TCP segment. Flag 301 is a one bit field and fragment offset 302 is a multi-bit field. Flag 301 and fragment offset 302 together indicate whether datagram 332 is a fragment of a larger datagram. IP checksum 303 is a 16-bit field that is the one's compliment of the sum of the remaining 16-bit words in IP header 326. IP header 326 is described in detail in RFC 791.

Figure 8:
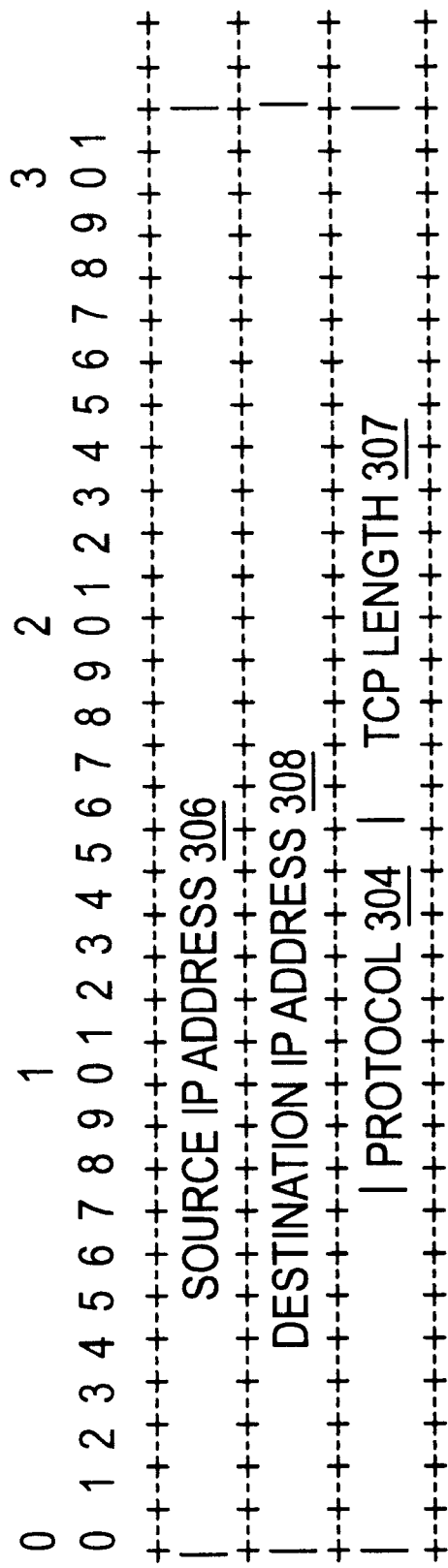
FIG. 8 depicts the pseudo header used in the calculation of the TCP checksum.

In TCP header 328 (FIG. 7), source port field 310 is an identifier corresponding to FTP server process 55 in node 276 and destination port 312 is an identifier corresponding to FTP client process 85 in local node 1000. TCP checksum 322 is the one's compliment of the sum of the remaining 16-bit words in TCP header 328, each 16-bit word in TCP data area 324, and the 6 16-bit words shown in FIG. 8. FIG. 8 is a "pseudo-header" encoding source IP address field 306, destination IP address field 308, the value of IP protocol field 304, and the length of TCP data area 324. TCP header 328 is described in detail in RFC 793.

5. Datagram defragmentation description

In the system depicted in FIG. 1, a fragmented datagram is one which left the remote node 276 as a single datagram, but while traversing different networks to get to the local node 1000, was broken down into smaller, but complete, datagrams. Referring to FIG. 6, the IP header 326 of each fragment is identical to that of the original non-fragmented IP header, except for the "more fragments bit" in flags 301, the datagram length 330, and the fragment offset field 302. The more fragments bit is zero only on the fragment which contains the last byte of the original datagram. The fragment offset field 302 indicates how many bytes from the beginning of the original datagram the first byte of the fragment is. The datagram length 330 is modified to match the new length of the fragment.

Whenever a datagram is received by a standard protocol process, the IP checksum 303 is calculated to determine the datagram's validity. If valid, the header is checked to see whether or not the datagram is a fragment. This is indicated by the more fragments bit in flag 301 and the fragment offset 302. If the more fragments bit is set then the datagram is immediately known to be a fragment from the beginning or middle of the original datagram. If the more fragments bit is zero, and the fragment offset 302 is not zero, then the datagram is known to be a fragment from the tail end of the original datagram. In either case the datagram is stored in memory 18 by CPU 10 on CPU card 110 in FIG. 3, based on its relative offset from the beginning of the datagram. Any non-fragmented datagram is automatically stored at its own base address in memory 18 as indicated by the fragment offset field 302. The partial checksum of the datagram is also determined and saved off (if TCP or UDP protocol). When other datagrams are received which have identical source IP addresses 306, identification field 333, and destination IP addresses 308, they are known to be another fragment of that first fragment. They too are stored into memory 18 based on their relative offsets, and their partial checksum (if TCP or UDP protocol) is added to the first. The total length of the datagram is determined when the tail end fragment is received. The total datagram length is determined from the datagram length field 330 and the fragment offset 302. When the entire datagram has been received, as indicated by receiving the correct number of bytes, the pseudo header depicted in FIG. 8, is added to the checksum and the TCP or UDP checksum is checked for validity (equal to 0). If the entire datagram is determined to be valid (or the protocol is not TCP or UDP with checksum), then the datagram is passed on to complete processing. Subsequently, the data is sent on to the application.

B. Internet Accelerator architecture

Figure 9:
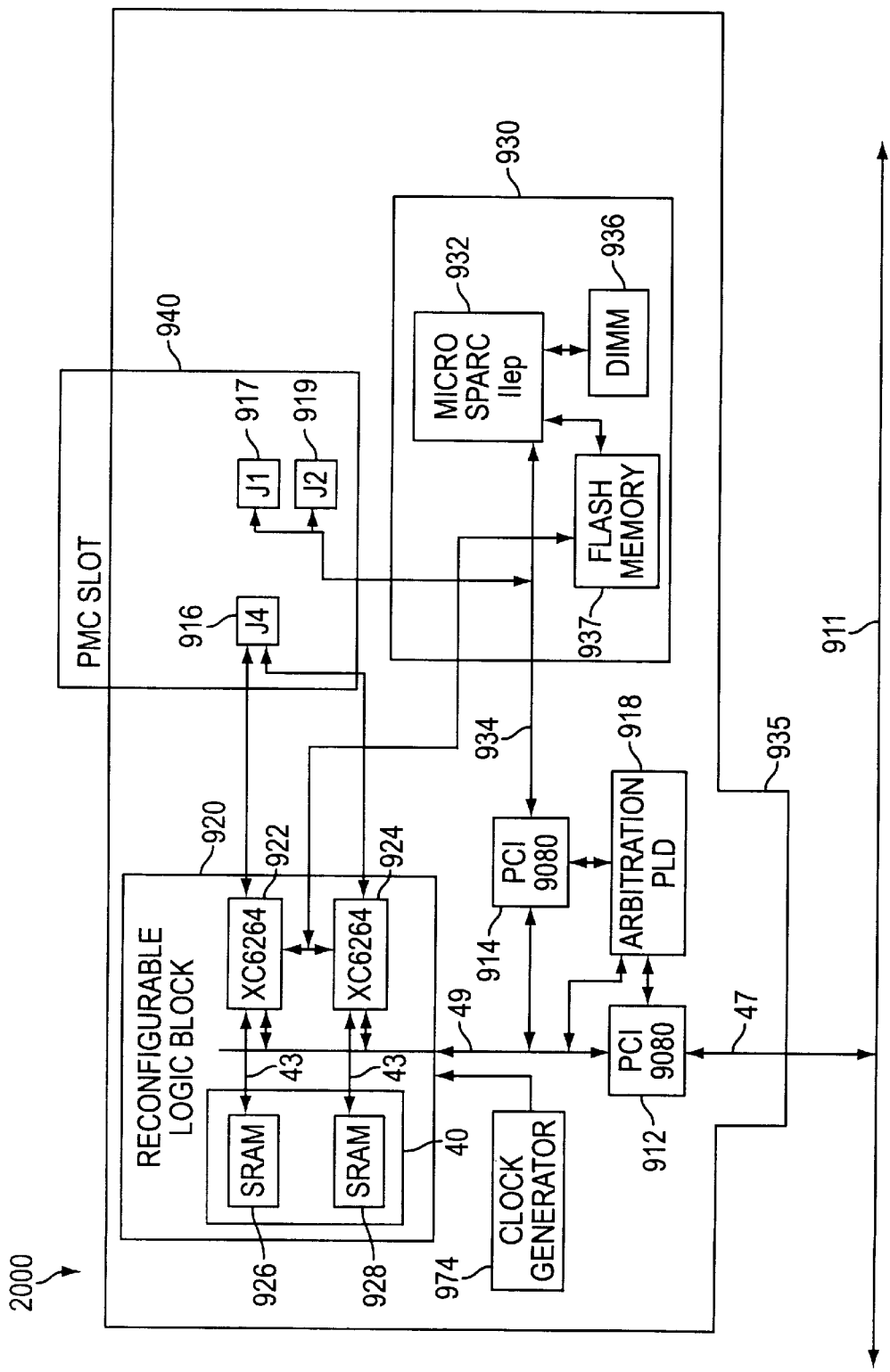
FIG. 9 depicts the physical architecture of the preferred embodiment of the network card.

FIG. 9 depicts the physical architecture of network card 2000 (the ACEcard) or Internet accelerator, comprising the preferred embodiment of the present invention. The ACEcard is a full length PCI card (see PCI specification 2.1 s), consisting of three major functional blocks. These blocks are the reconfigurable logic block 920, the microSPARC IIep subsystem 930, and the PCI Mezzanine Connector (PMC) slot 940. These three blocks are connected by means of industry standard bus interfaces, as well as other interconnects as described more fully below.

1. Architecture overview

The ACEcard communicates with the host processor (CPU 10) via a 32-bit PCI bus interface operating at 33 MHz. These connections are provided through a card edge connector 935 (standard PCI) which links the motherboard's (card into which the ACEcard is attached) PCI bus 911 to a PCI 9080 bridge chip 912 (Manufactured by PLX Technology part number PCI9080). This bridge chip 912 serves to translate the PCI bus to an "i960" style bus (non-multiplexed address and 32-bit data, read, write, and chip select). Additionally this bridge chip contains two independent DMA channels for high speed data transfers.

The two DMA channels in bridge chip 912 are used to efficiently transfer data from the SRAM memory 926 and 928 of the reconfigurable logic block 920 to the host memory where the application using the network interface, or the remainder of the protocol stack, is running. The control of these two DMA channels comes from the device driver (not shown) running on the host processor. The device driver serves to manage the resource and control data movement.

The microSPARC IIep 932 is connected to the PMC slot via a "local" PCI bus 934. That is, the local PCI bus 934 herein is wholly contained within the confines of the ACEcard, and provides no direct connection to any subsystems off of the ACEcard. This local PCI bus 934 is also a 32-bit 33 MHz bus following the PCI specification. Arbitration of this bus is performed by the microSPARC IIep PCI bus interface. This local PCI bus 934 also connects to a second PCI 9080 bridge chip 914, translating it to an "i960" style bus. This "i960" bus is the same as the one generated by the first PCI 9080 bridge chip 912. Thus the microSPARC IIep 932 and the PMC slot 940 are connected to the reconfigurable logic block through the second PCI 9080 bridge chip 914 and across the "i960" bus. Similarly the microSPARC IIep and the PMC Slot 940 can communicate with CPU 10 by going through the second PCI 9080 bridge chip 914, across the "i960" bus, through the first PCI 9080 bridge chip 912 and onto the host PCI bus 911.

This completes the industry standard bus interconnects of the three subsystems on the ACEcard. Additional interconnects are provided between these subsystems in the following manner. The PMC slot is directly connected to the reconfigurable logic block by 42 parallel lines (wires). These lines are split across the two reconfigurable chips evenly. That is, there are 21 dedicated general purpose lines between each reconfigurable chip and the PMC slot. These 42 lines utilize the J4 "user defined" connector 916 of the PMC specification. Alternatively, it is envisioned that a network interface card (NIC) could be built which incorporates a physical interface, network interface chip set, and memory resources which transfers data to and from the NIC via this user-defined connector. The direct connection to the reconfigurable logic block 920 and lack of bus protocol overhead will allow for higher network and processing speeds in the preferred embodiment of the present invention.

The reconfigurable logic block 920 consists of two elements, the reconfigurable Field Programmable Gate Arrays (FPGAs) 922 and 924, and the SRAM memory resources 926 and 928. One presently preferred scheme for connecting and programming programmable packages with memory packages is disclosed and claimed in assignee's copending patent Application of TOBY D. BENNETT, et al. for a PROGRAMMABLE CIRCUIT ASSEMBLY FOR HIGH BANDWIDTH DATA PROCESSING, Ser. No.: 08/752,940, filed Nov. 21, 1996, the contents of which is incorporated herein by reference.

Two reconfigurable FPGA's 922 and 924 are used on the ACEcard. These chips are the XC6264-2HQ240C manufactured by Xilinx. These chips are run time reconfigurable and partially reconfigurable. This means that the function of the chip may be changed at any time and at any level down to a gate or a net. See Xilinx XC6200 Family manual for further description of the internal architecture of the reconfigurable FPGA's. The global routing resource of each chip provides a low-skew, low delay connection to every cell within the part. The interconnects between the parts may be used as either inputs, outputs, or bi-directional connections between the two chips as they are configured at any given instant. These interconnects are used in the preferred embodiment of the present invention as a means of communication between the de-fragmentation lookup subsystem and the rest of the processing subsystems. Datagram ID numbers, source IP addresses, byte counts, and checksums are passed to the lookup subsystems via these lines, and address to store the data to (in order to correctly de-fragment), previous counts, and previous checksums are returned via this same path. This allows for effective division of the functions of the preferred embodiment of the present invention across the two reconfigurable chips. In the preferred embodiment, the reconfigurable logic block comprises the protocol logic subsystem 45 shown in FIG. 2B.

Although it is presently preferred that protocol logic subsystem 45 be implemented with circuitry in programmable arrays, protocol logic subsystem 45 may be implemented by sequential instructions executed by a conventional microprocessor on network card 2000. Conversely, protocol logic subsystem 45 might be implemented with dedicated hardware on network card 2000.

The SRAM (Static Random Access Memory) memory resources 926 and 928 are configured as halves of the overall memory space, each reconfigurable chip having an associated bank of memory. The memory is 217 locations deep by 32-bits wide, giving 512 Kbytes of memory per reconfigurable chip. The combined memory provides 1 Mbyte of SRAM on the ACEcard. The memory is configured to allow for single cycle memory writes and pipelined single cycle memory reads for high speed data transfers.

The PMC slot 940 is an industry standard 32-bit PCI bus mezzanine connection system. Three connectors are provided. Two connectors are used for the PCI bus interface as well as power and ground signals. Both 5V and 3.3 V power supplies are supported, but only a 5V PCI bus interface is provided. A third connector is provided as well that is used for a TSI TelSys proprietary direct interface to the reconfigurable logic block.

The PMC slot will be used in the preferred embodiment of the present invention as the interface to the Network Interface Card (a 4515 ATM PMC by Interphase Corp.). This PMC is a standard PMC form factor card, utilizing a 32-bit PCI bus interface. This PMC, however, does not make use of the J4 connector 916. In an alternative embodiment, the third connector may be used to allow more direct, high speed data movement between the memory resources of a Network Interface Card and the reconfigurable chips of the reconfigurable logic block 920.

The microSPARC IIep subsystem 930 consists of three major components. These are the microSPARC IIep embedded processor 932, the flash memory 937 (used as a boot memory), and an industry standard DIMM memory module 936.

The microSPARC IIep 932 is a highly integrated Sparc based embedded processor. The operating frequency is derived from the host PCI bus clock (33 MHz) and is then multiplied by three to obtain a 100 MHz internal system clock. The embedded processor incorporates a PCI bus interface as well as a PCI bus controller, allowing it to communicate with the other subsystems on the ACEcard via the local PCI bus 934. The local PCI bus 934 is arbitrated and otherwise controlled by the microSPARC IIep's PCI controller. This local bus 934 is connected to the "i960" bus via the second PCI 9080 bridge chip 914. Also connected to this local PCI bus is the PMC slot 940. For additional features and information regarding the microSPARC IIep embedded processor see the STP 1100BGA data sheet from SUN Microelectronics.

The microSPARC IIep 932 serves in the case of the preferred embodiment of the present invention to initialize, maintain, control, and move data to/from the NIC located in the ACEcard PMC slot 940. In other words, the microSPARC IIep 932 performs all of the device driver functions for the NIC. These driver functions will be executed indefinitely (in a loop), with the instructions and data being located in the DIMM memory 936 attached to the DIMM interface on the microSPARC IIep 932.

The flash memory 937 is an 8 Mbit device and serves to hold instructions and data necessary to bootstrap the microSPARC IIep processor after power on or any system reset.

The DIMM memory module conforms to JEDEC standard 21-C Release 7, section 4.5.3 "168 PIN UNBUFFERED DRAM DIMM FAMILY". The DIMM memory allows insertion of up to 64 MBytes into the ACEcard. This memory is used for applications running on the microSPARC IIep for both instruction and data storage. The DIMM memory module 936 is configured as 64 bits wide using no parity bits. The ACEcard provides buffering of the address and control signals to the DIMM memory, thus the DIMM needs to be an unbuffered module.

The DIMM memory module 936 in the preferred embodiment of the present invention is used for instruction and data storage for the ATM PMC device driver running on the microSPARC IIep. This memory is not presently used for datagram storage, nor is it used for protocol processing memory.

The "i960" bus arbitration logic 918 controls access to the "i960" bus, manages any interrupts to the host card, and generates control signals to the reconfigurable logic block. These functions are performed in the arbitration Programmable Logic Device (PLD) (AMD MACH210A-7JC).

The bus arbitration logic 918 is responsible for accepting requests for use of the bus, serving grants for use of the bus, asserting chip select control lines to each device on the bus based on bus addresses issued, and terminating bus transfers when instructed. The allocated space in the device memory map for each subsystem on the ACEcard is statically allocated by the programming of this PLD.

2. Hardware Description

The preferred embodiment of the present invention uses the ACEcard as described above. However, in order to make more cost competitive systems according to the present invention, as well as improve overall system performance it may be necessary to create other, more specific embodiments of the invention which contain only the necessary hardware features, and emphasize those features which benefit performance.

The limiting factor for maximum data throughput rate in protocol logic subsystem 45 is the "i960" bus interface. This bus, in the previously described architecture, must be arbitrated between 4 DMA transfers. There is one read, and one write transfer per incoming and outgoing datagram flow. An optimized hardware solution would have the following aspects.

The protocol logic subsystem 45 and the network interface are co-resident on a single card and are connected through a bussed, or dedicated point to point interface. The protocol logic is implemented in either a reconfigurable FPGA, a dedicated ASIC, or a combination of both. The protocol logic has dedicated memory resources for datagram storage, and lookup tables for datagram defragmentation, and other protocol functions. Separate from the interface to the network interface subsystem, is an industry standard bus interface (PCI or "i960", or other), dedicated to datagram movement to and from the host processor/application/protocol stack memory. The end result is that the protocol logic subsystem (45) is now essentially "in line" with the datagram flow from processor to network interface, or vice-versa.

The other necessary subsystems to arbitrate the bus(es), generate clocks, provide zero wait state access to the protocol logic subsystem 45 memory, interface to the motherboard bus, generate proper voltages, etc. are similarly present on this modified card.

C. System processing—general

Figure 10:
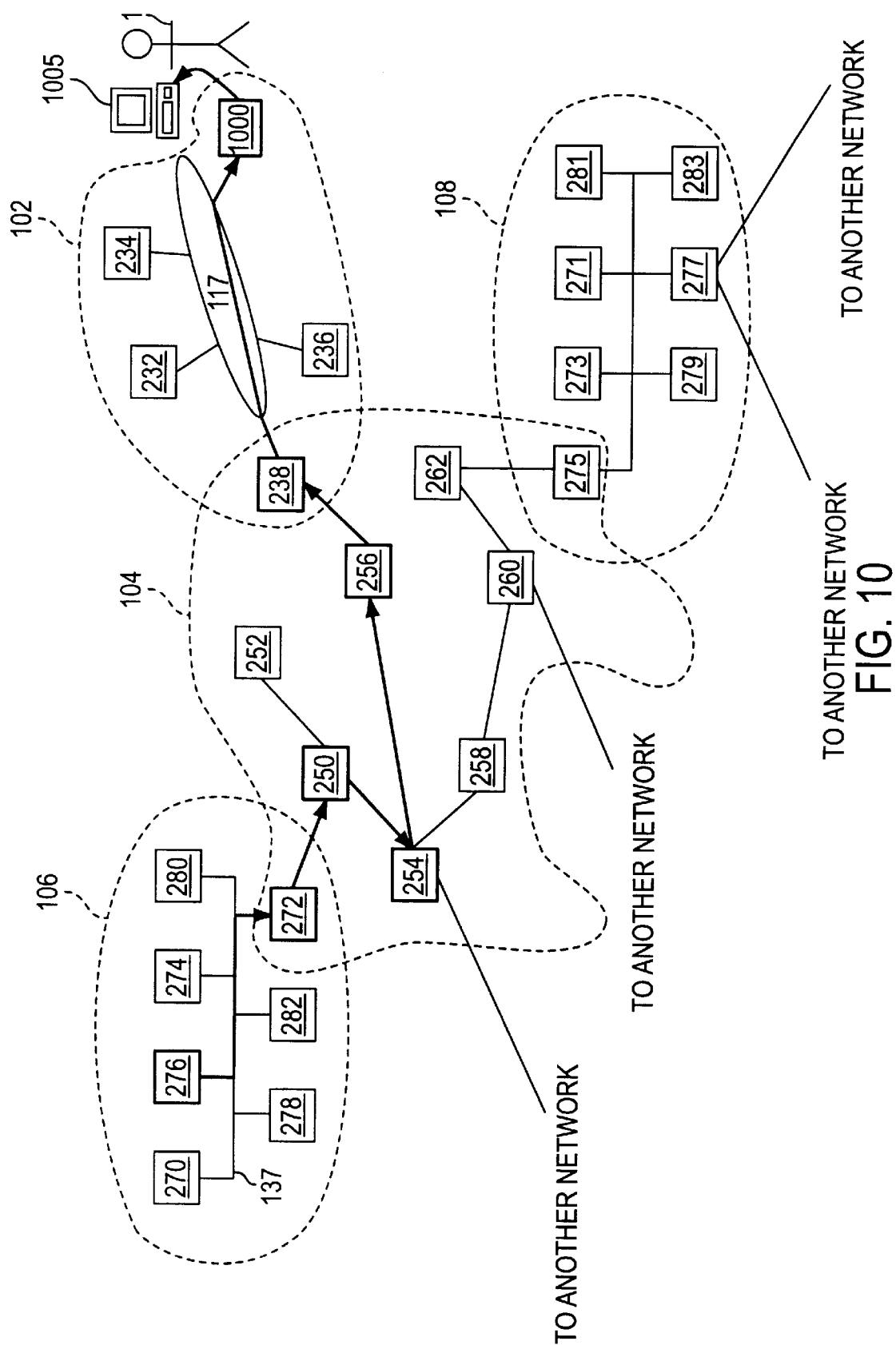
FIG. 10 depicts the path of a datagram through the network in FIG. 1 from the remote node at the university to the local node being used by the researcher.

Referring to FIG. 10, the researcher at local node 1000 requests information from remote node 276. Remote node 276 sends a response along the highlighted path in FIG. 10. Remote node 276 embeds a portion of research information into a TCP segment and embeds the TCP segment into an IP datagram addressed to local node 1000. Remote node 276 then embeds the IP datagram into an Ethernet frame addressed to computer 272 (an Ethernet frame having a destination station address equal to the address of computer 272), and sends the Ethernet frame over Ethernet cable 137. When computer 272 receives the Ethernet frame (containing the IP datagram), by recognizing its own Ethernet address in the frame sent on cable 137, computer 272 reads the IP destination address, determines that the IP datagram should be sent over network 104, and embeds the IP datagram within an network-104-formatted packet addressed to computer 238, using the protocol of network 104.

When computer 238 receives the packet via computers 250, 254, and 256, computer 238 reads the IP destination address, determines that the IP address corresponds to local node 1000, and embeds the IP datagram within a packet configured for network 102 and directed to local node 1000. More specifically, computer 238 embeds the IP datagram into an ATM cell having a header containing cell routing information to direct the cell through switches 117 to local node 1000.

In response to receiving the IP datagram which was contained inside the ATM cell, local node 1000 processes the datagram to reconstruct the original data sent by remote node 276. Once the receipt of the original data has been verified, local node 1000 generates an acknowledgment (ACK), which it sends to remote node 276.

In the preferred embodiment of the invention, the network card 2000 handles the reassembly of fragmented datagrams, and the buffering of segments to process out of order delivery of segments. Network card 2000 generates checksums for incoming TCP/IP and IP segments, and conditionally sends the segment to processes executed by CPU 10, depending whether a checksum result indicates that the segment is uncorrupted.

Responsive to the reception of a complete IP datagram and a valid checksum result, in a preferred embodiment the protocol logic subsystem 45 within network card 2000 (i.e. the hardware) automatically writes an ACK command to command list 42. In an alternative embodiment, in response to deciding that an ACK should be sent to the remote process, TCP process 91 (i.e. the software) writes an ACK command into memory on network card 2000, instructing card 2000 to send the ACK. Subsequently, network card 2000 prepares and sends the ACK, synchronously with CPU 10 if an outgoing datagram is received before a periodic clock event (piggybacking), or asynchronously with CPU 10 otherwise (upon the expiration of the 200ms-delayed ACK timer).

In an alternative embodiment, the software instructions send a TCP ACK segment in response to receiving an incoming TCP segment from network card 2000. Because network card 2000 only sends the incoming TCP segment to the software if the TCP checksum result is zero, the combined processing of the software instructions and network card 2000 acts to selectively send a TCP ACK segment to the network, depending on the TCP checksum result generated on network card 2000.

One advantage of the preferred embodiment is that conventional TCP/IP software may be modified to work with network card 2000. Although these software modifications must be performed carefully, the modifications are not extensive. Thus, a conventional TCP/IP capable computer may be modified by performing relatively minor software changes and substituting network card 2000 in place of a conventional physical-layer-interface card.

Figure 11A:
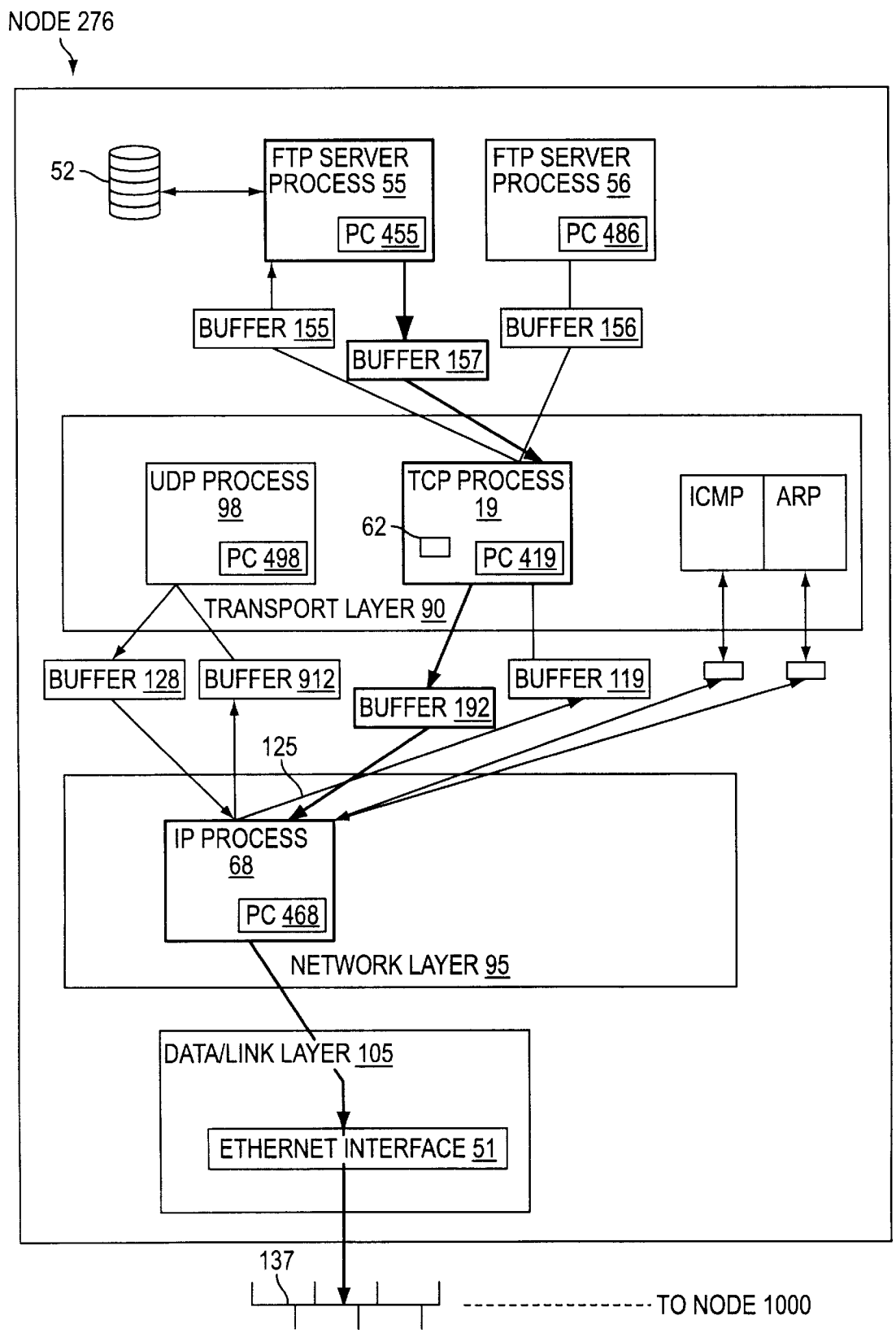
FIGS. 11A and 11B depict the path of a datagram in FIG. 10 through the functional processes shown in the network architecture in FIGS. 2A and 2B.
Figure 11B:
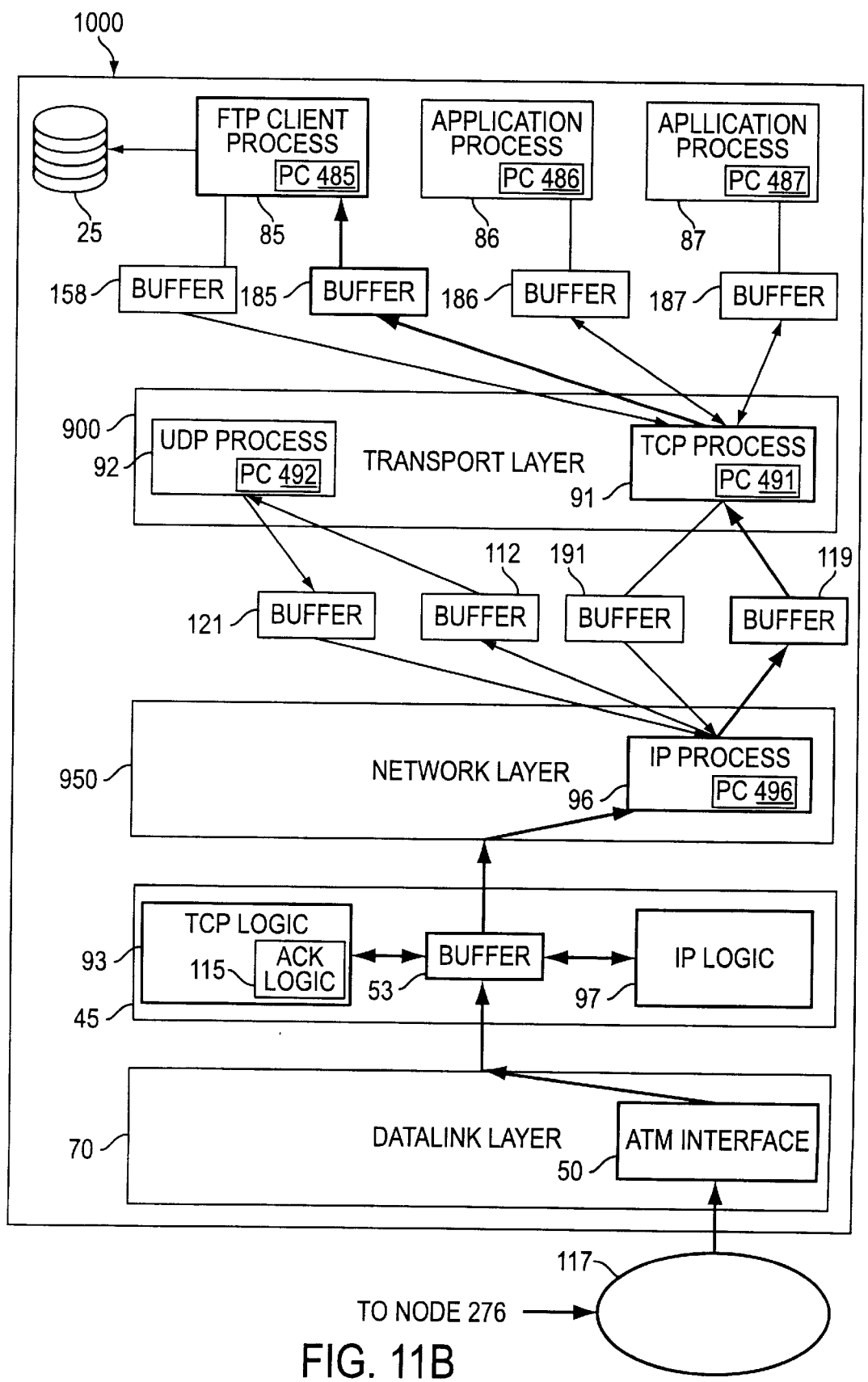

D. System processing—incoming datagram Referring to FIG. 11A and FIG. 11B, transport layer 90, network layer 95 and datalink layer 105 in remote node 276 cooperate with transport layer 900, network layer 950, and data link layer 70 in local node 1000 to reliably send data from FTP server process 55 executing on remote node 276 to FTP client process 85 executing on local node 1000. Referring to FIG. 11A, remote node 276 transforms a TCP segment into an IP datagram as it travels from TCP process 19 to buffer 192, to IP process 68, to Ethernet interface 51. The datagram then travels via Ethernet cable 137, through the network nodes described in reference to FIG. 1 above, to ATM switches 117. Referring to FIG. 1B, the TCP segment then travels from switches 117 to ATM network interface chip 50 on network card 2000, to protocol logic subsystem 45, to buffer 53 from there to IP Process 96 to buffer 119 to TCP Process 91. TCP process 91 removes the routing information from the TCP segment and stores the resulting data in buffer 185 for acceptance by FTP client process 85.

Figure 12:
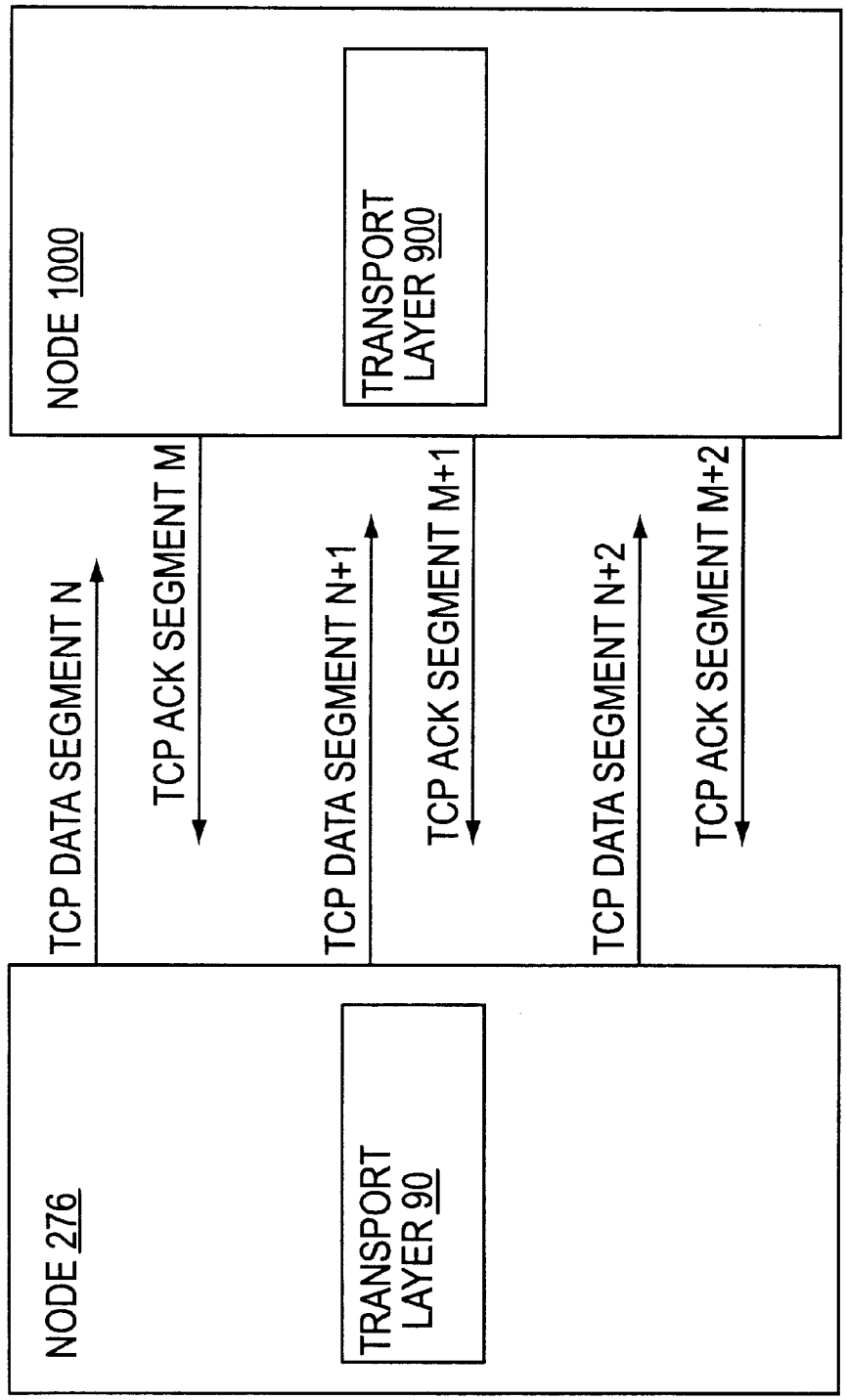
FIG. 12 depicts the data flow and acknowledgment between the two nodes shown in FIGS. 2A and 2B.

FIG. 12 is a diagram representing TCP data segments sent between node 276 and node 1000. When transport layer 900 in local node 1000 receives TCP segment N from transport layer 90 in node 276, transport layer 900 sends a TCP ACK segment M back to transport layer 90. Similarly, transport layer 900 sends ACK segment M+1 in response to successfully receiving segment N+1, and sends ACK segment M+2 in response to successfully receiving segment N+2. These TCP ACK segments may originate either in TCP process 91 executed by CPU 10 or in TCP logic 93 on network card 2000.

One advantage of sending the ACK commands directly from TCP process 91 to command list 42 is the avoidance of the overhead of switching processes to generate TCP ACK segments upon expiration of the delayed ACK timer, which typically has a 200 ms period. This advantage is especially important for TCP/IP implementations that use separate processes for TCP input and output processing. See, for example. Comer. Douglas E. and David L. Stevens, *Internetworking with TCP/IP, Volume 2, Design, Implementation*, and Internals, Prentice-Hall 1994, Page 192, describing an implementation of TCP using three processes.

Figure 13A:
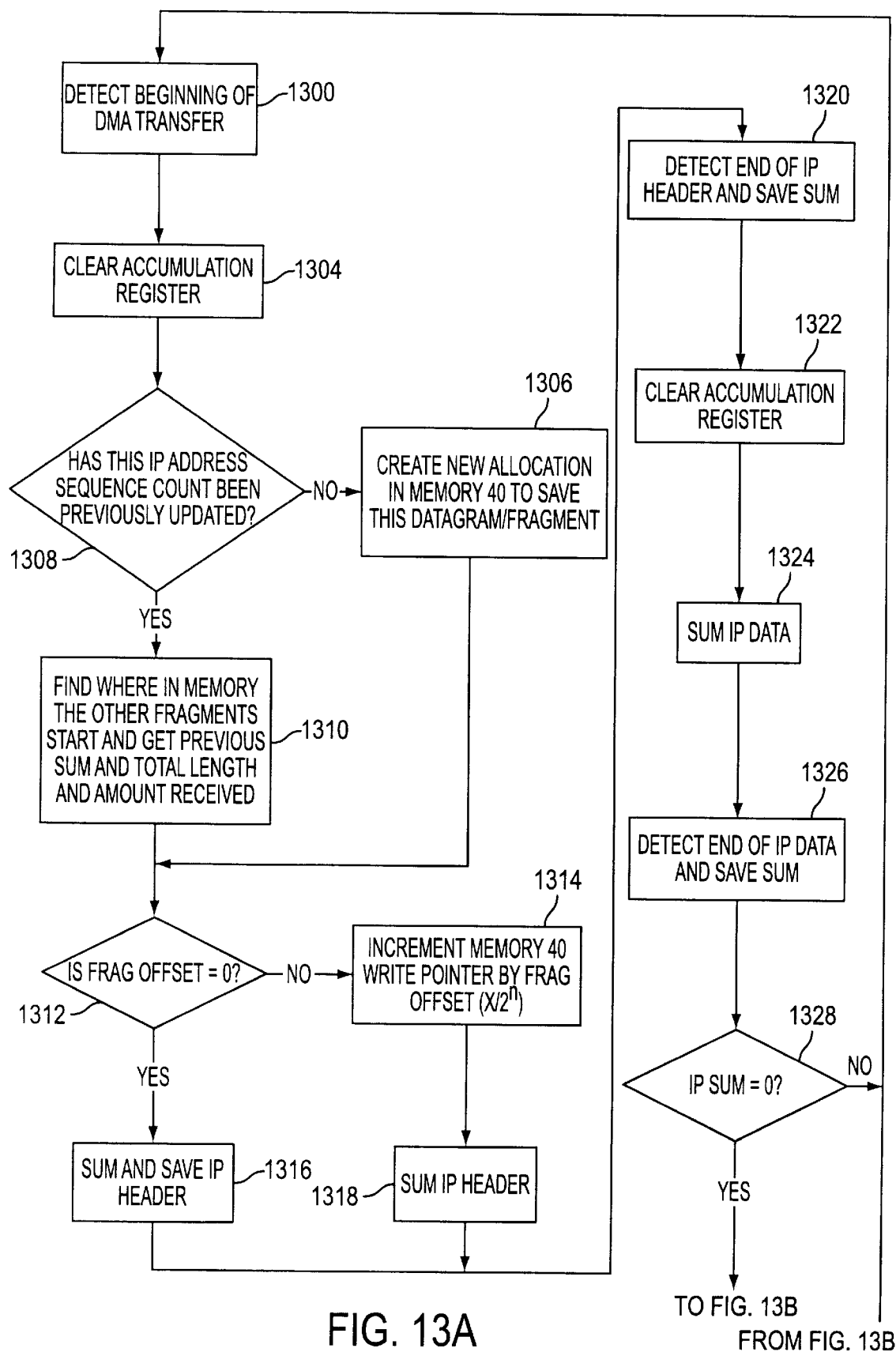
FIGS. 13A and 13B are a procedural flow chart showing the processing performed by the network card in the local node being used by the researcher when the local node receives a datagram-embedded segment.
Figure 13B:
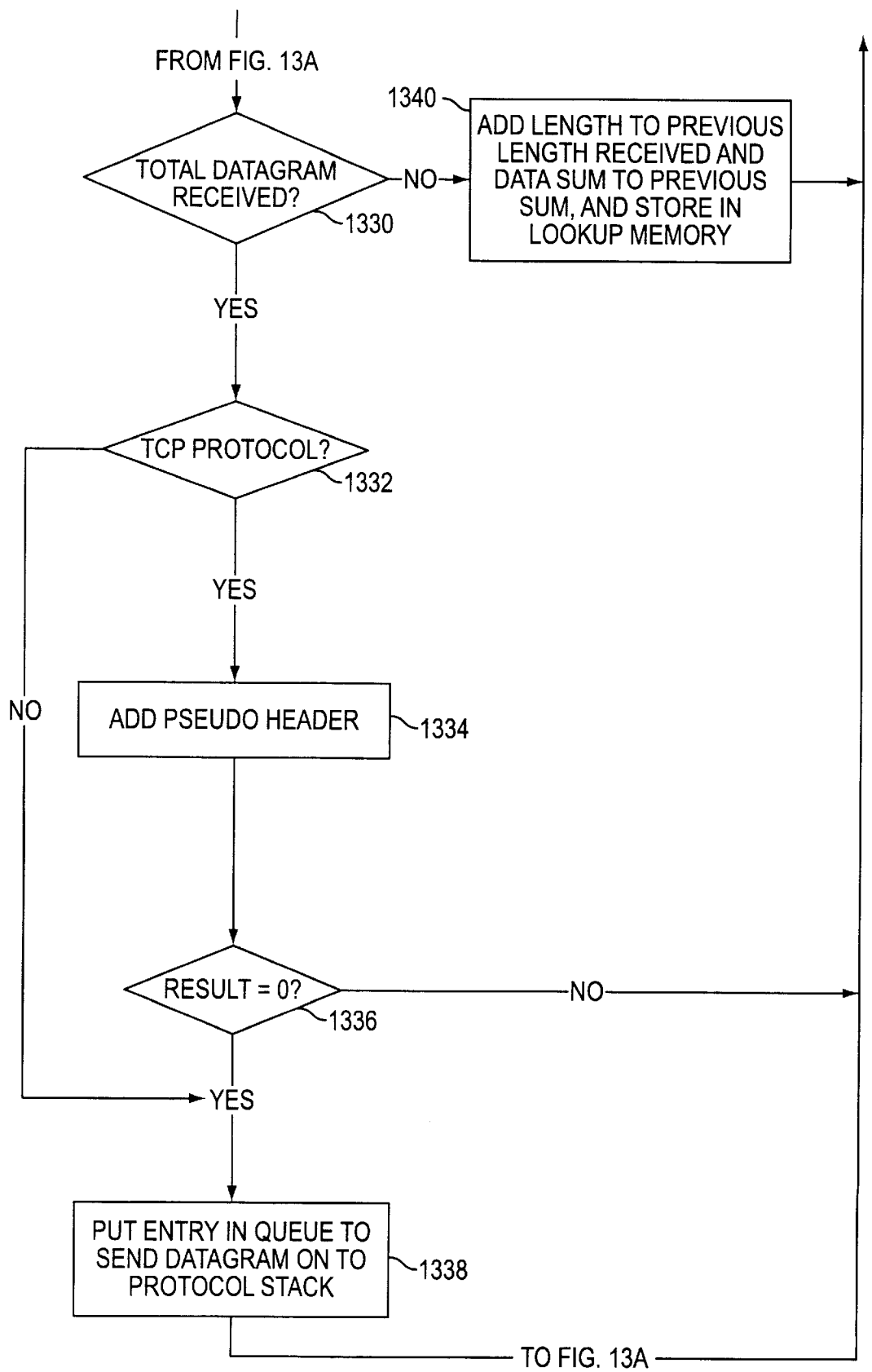

FIGS. 13A and 13B comprise a flow chart of the processing by network card 2000 in response to receiving a datagram from ATM switches 117. Protocol logic subsystem 45 detects the beginning of a DMA transfer (step 1300) by ATM network interface chip 50 to datagram buffer 53 in memory 40 via bus 49. Protocol logic 45 then clears an accumulation register which will be used to calculate the IP and TCP checksums (step 1304). As the DMA continues, the source IP address 306 and Identification 333 (this pair represents an IP datagram identifier) are checked against any other recently received datagrams, by the datagram defragmentation lookup subsystem (step 1308). If no other fragments from the same IP datagram identifier pair are found a new allocation in datagram memory 53 is created to store this datagram or fragment (step 1306). If other fragments from the same IP datagram identifier have been recently received, the datagram defragmentation lookup subsystem will find this match and return the base address of the memory 53 allocation where the previously received fragment(s) were stored. Additionally the number of bytes, cumulative checksum as of receiving this fragment, and total length of the defragmented datagram are returned (step 1310). Once the base address in datagram memory 53 at which to store the fragments has been determined, the fragment offset 302 is used to store the fragment in datagram memory 53 such that the original byte order of the datagram is restored. If the fragment offset 302 is not equal to zero (step 1312), then the memory write pointer is incremented by the fragment offset value (step 1314) and the duplicated IP header is not stored to datagram memory 53 (step 1316). If the fragment offset is equal to zero, the IP header is stored to datagram memory 53 along with the IP data area (step 1318) while the data being transferred is summed. Based on the base address returned and the fragment offset field 302, the entire datagram can be re-created in datagram memory 53 in the correct order. By looking at the fragment offset 302, datagram length 330, and flags 301, the total length of the defragmented datagram can be determined. When the cumulative count of data transferred equals this value, the datagram is known to be defragmented, and validation of the checksums can occur.

Protocol logic 45 sums the data on 16-bit boundaries as it is transferred, and these sums are added to the accumulation register (steps 1316 and 1318). When the end of the IP header is detected, as indicated by the amount of data having been transferred equaling the value in header length field 329, the IP header checksum value in the accumulation register is saved (step 1320) and the accumulation register is cleared (step 1322). As the DMA transfer continues the data is summed on 16-bit boundaries (step 1324), added to the accumulation register and stored to datagram memory 53 based on the fragment offset. When the amount of data transferred equals the value in datagram length field 330, the end of the datagram is detected and the IP data area sum is saved from the accumulation register (step 1326). Protocol logic 45 determines if the IP checksum, saved in step 1320, is equal to zero (step 1328). If the IP checksum is not equal to zero, indicating that IP header 326 is invalid, control returns to step 1300, thus discarding the corrupted datagram. If IP header checksum is equal to zero, control passes to step 1330. Protocol logic 45 determines whether all fragments of the datagram have been received by comparing the cumulative count of data transferred (previous value plus the number of transfers for this fragment) equal the total datagram length (step 1330). If the entire datagram has not been received as indicated by the transfer count not equaling the determined total length, then the total number of transfers, the cumulative sum of the IP data area's, and the total datagram length are stored to datagram defragmentation lookup memory, and control is returned to step 1300 (step 1340). If the total datagram length does match the number of transfers, then protocol logic 45 determines if the defragmented datagram is a TCP segment by checking protocol field 304 of IP header 326 for equality to 6 (step 1332). If the datagram is a TCP segment, then the pseudo header, detailed in FIG. 8, is added into the IP data area sum saved in step 1326 (step 1334). The result of this summation is checked for equality to zero (step 1336). If this result is not equal to zero, indicating that the datagram is corrupted, then control is passed back to step 1300. If the result is equal to zero, or if the protocol field is not equal to 6 (from step 1332), then an entry is made into the datagram disposition queue, and a semaphore is set (not shown) or an interrupt generated to indicate to the protocol stack that a datagram is available for further processing in datagram memory 53 at the location indicated by the datagram disposition queue. Control is then returned to step 1300.

Figure 14A:
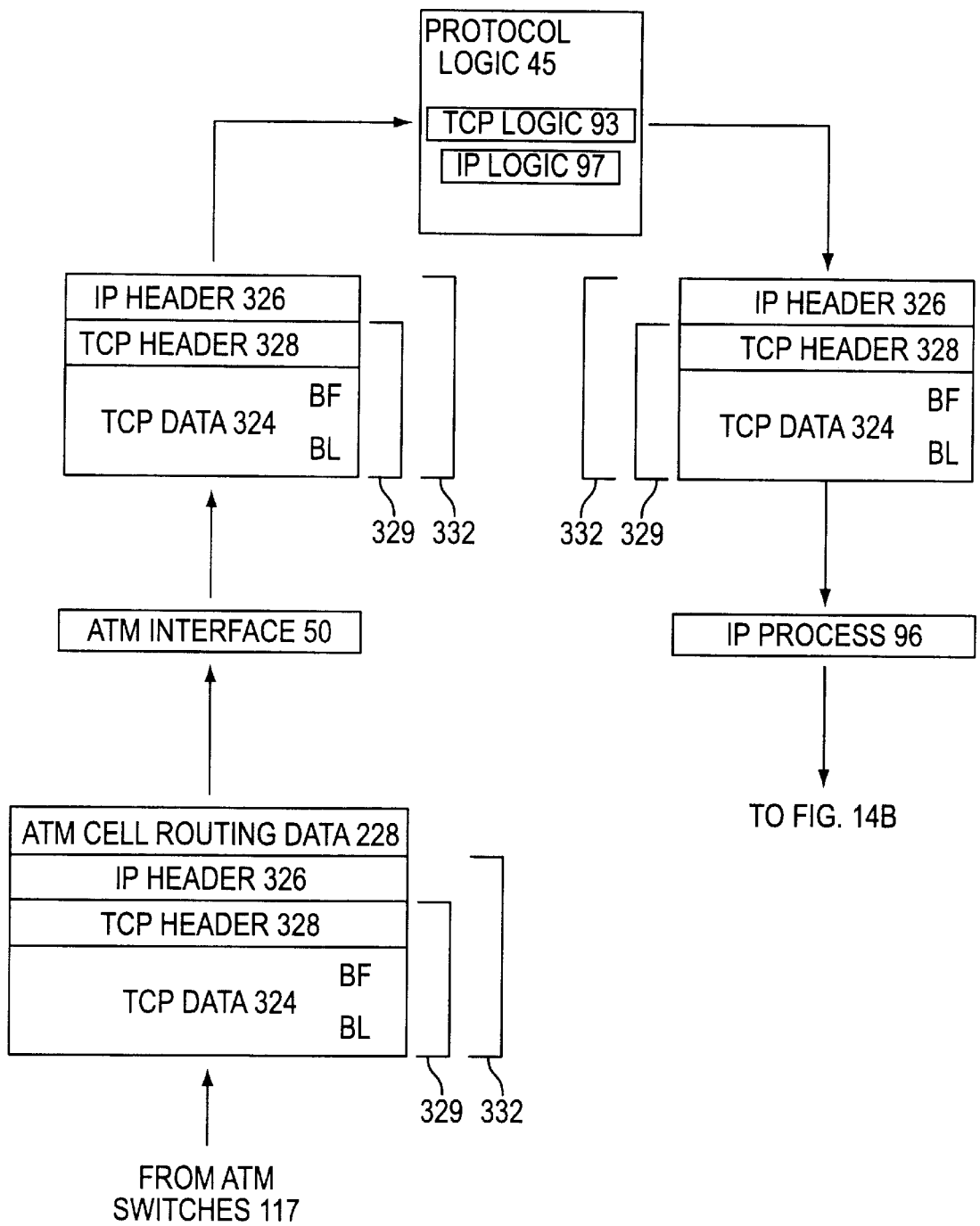
FIGS. 14A and 14B are data flow diagrams showing the data flow when the local node in FIG. 1 receives a datagram-embedded segment.
Figure 14B:
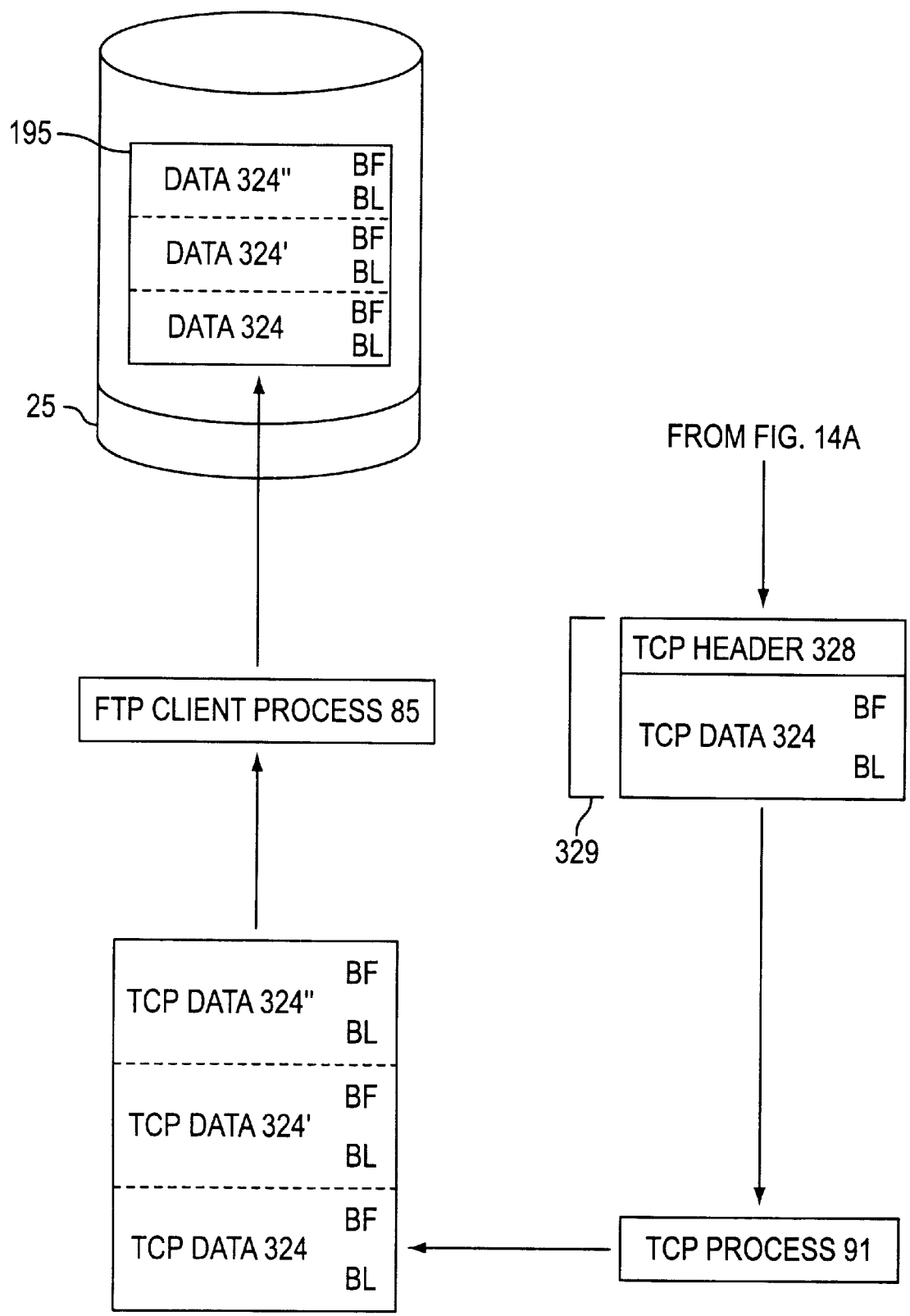

Unlike conventional protocol stack processing, the preferred system and method temporally interleaves the processing of different levels of the TCP/IP protocol stack to process a single datagram. FIG. 14A and FIG. 14B depict the data flow of the process described above. As shown in FIG. 14A and FIG. 14B, TCP logic 93 processes the TCP segment in the IP datagram, by verifying that the TCP segment is uncorrupted. Simultaneously, IP logic 97 processes the IP header by verifying that the IP header is uncorrupted. Subsequently, IP process 96 removes the IP header, after which TCP process 91 resumes the processing of the TCP segment.

FIG. 14B shows a file reassembly process working with certain file transfer modes to generate an output file. As shown in FIG. 12, TCP data area 324" was received in TCP segment N, TCP data area 324' was received in TCP segment N+1, and TCP data area 324 was received in data segment N+2. Each of TCP data area 324", 324', and 324 includes a first bit BF and a last bit BL. As shown in FIG. 14B, the portion of the file reassembly process performed by TCP process 91 and the processing of FTP client process 85 results in the generation of a data file 195 on disk 25. In data file 195 the bits from TCP data area 324", 324', and 324 are logically contiguous.

In other words, if the TCP segment that contained the TCP data area 324' is considered a first network signal, and the TCP segment 329 containing TCP data area 324 is considered a second network signal, the processing of TCP process 91 and FTP client 85 generates a file (a disk memory signal) having the last bit BL of TCP data area 324' of segment N+1 (the second data area of the first network signal) adjacent to the first bit BF of TCP data area 324 of segment N+2 (the second data area of the second network signal). To effect the transfer of file 195 onto disk 25, CPU 10 and FTP client process 85 act to send the bus address of disk controller card 120 to the address lines of PCI bus 30.

Referring back to FIG. 3, the preferred embodiment of the present invention includes modified UNIX TCP/IP software, executing on CPU 10, and a network card 2000 in communication with the CPU 10 via shared PCI bus 30. Card 2000 includes a network interface chip (ATM network interface chip 50), memory chips, and reconfigurable logic chips. CPU 10 sends and receives network packets via card 2000.

Network card 2000 in local node 1000 includes bus interface circuitry 37, coupled to the address lines of PCI bus 30 via connector 31 of card 2000, for recognizing the respective bus address for card 2000. ATM network interface chip 50 receives an IP datagram (a network signal) from network 102. Protocol logic subsystem 45 includes circuitry for processing the TCP segment (the first data area) in the datagram and the TCP pseudo-header (selected part of the first header), to generate a TCP checksum. Protocol logic subsystem 45 includes other circuitry for selectively sending the network signal to PCI bus 30, depending on the TCP/IP checksum result generated by the processing circuitry.

The sending circuitry in protocol logic subsystem 45 includes circuitry for sending the bus address of RAM card 115 to the address lines of PCI bus 30, to effect the DMA transfer of the datagram to memory.

In the preferred embodiment, automated defragmentation occurs within the protocol logic subsystem 45. Referring back to FIGS. 6, 7, and 8, when any datagram is received, the source IP address 306 and the datagram sequence number 314 are used to access a lookup table located in memory 40. If an entry is found which matches, and the entry is valid, then the base address (address of the first byte of the datagram) of the matching fragments is read from the lookup table. Additionally the number of bytes received as of receiving this new fragment, and the cumulative checksum of the data area of each fragment are looked up and passed to the rest of the protocol logic 45. If the fragment offset is zero then the whole fragment is written to the datagram memory beginning at the base address. If the fragment offset 302 is not zero then the datagram data area only (not the duplicated IP header) is written to the datagram memory starting at the base address plus the fragment offset value. If the more fragments bit in 301 is zero, then the fragment offset 302 is added to the datagram length (minus the length of the IP header 329) to determine the overall length of the original datagram. If the current datagram length 330 plus the previous datagram length (value obtained from the lookup table) are not equal to the total length, then the total datagram length value is passed back to the lookup table and stored until the next fragment is received. Similarly the new cumulative count and checksum (previous values plus the count and checksum calculated for the current fragment) are passed back to the lookup table and stored. The TCP checksum 322 is only checked once all fragments have been received, and after the pseudo sum (FIG. 8) has been added to the sum. If the TCP checksum 322 is zero, then the datagram has been validated. and an entry is made in the datagram disposition queue (list of address and length, that the host processor uses to initiate DMA's). At this point an entry is also made into the ACK queue 42, indicating that an ACKnowledgment should be sent to the sender to indicate valid receipt of the datagram (automated ACK generation).

After the first datagram fragment is received (first chronologically, not necessarily first in byte order), a timer is begun (in both the automated and the protocol stack driven methods of datagram defragmentation). If this timer expires before all the fragments of a datagram are received, then the received fragments are discarded. In the case of the network card 2000, the deletion of the fragments is accomplished by clearing the valid indicator in the lookup table, thus freeing up the base address to be used for another datagram.

The advantages of hardware defragmentation within the network card 2000 are several fold. The defragmentation allows for full datagram checksumming and validation which leads to automated ACK generation. It also means that CPU 10 (the host processor) receives only one interrupt to receive data per datagram, where without defragmentation, the host processor would receive one interrupt per datagram fragment. Similarly, once defragmentation is done and the checksum is completed, the datagram can be validated. This means that only known valid datagrams are passed on to CPU 10. This too serves to reduce the number of interrupts that CPU 10 must handle. By using the preferred embodiment of the present invention, CPU 10 now receives only complete valid datagrams, and no cycles are spent in processing invalid or incomplete datagrams.

Upon successful defragmentation of the datagram and validation of all applicable checksums, local node 1000 generates an acknowledgment (ACK) to be sent back to remote node 276. Referring back to FIG. 11B, TCP logic 93 includes acknowledgment (ACK) logic 115, allowing TCP processing in local node 1000 in the preferred embodiment to automatically generate an ACK segment (a TCP segment containing a set ACK flag in the TCP header). To accomplish this, protocol logic 45 saves the fields necessary to automatically generate the ACK datagram. These fields are taken from the protocol logic state and the incoming datagram headers. The saved data includes source IP address, datagram sequence identification number, source TCP port number, destination port number, and the available datagram memory (used for window size). These values are stored by TCP logic 93 in command list 42, which is resident in protocol logic 45.

In an alternative embodiment, local node 1000 may generate an ACK segment by one of two separate mechanisms in response to an IP datagram being passed up from protocol logic subsystem 45. First, TCP process 91 may construct an ACK segment and send the ACK segment to IP process 96 via output buffer 191. Alternatively TCP process 91 may send a 5-word ACK command to TCP logic 93, which gets written into command list 42, which is resident in protocol logic 45.

To send the ACK command, a 5-word command is written into command list 42 of memory 40 on network card 2000. In the preferred embodiment, protocol logic subsystem 45 sends the ACK command to command list 42. Alternatively, CPU 10 sends the ACK command to command list 42. Table 1 below shows the format of the ACK command sent to network card 2000:

RECEIVER PORT NUMBER
RECEIVER IP ADDRESS
SENDER PORT NUMBER
ACK NUMBER
WINDOW

TABLE 1

Each word in Table 1 corresponds to a word in a datagram-embedded TCP segment ACK to be constructed by network card 2000. In this particular example, receiver port number is 20, which is a standard port number for the data connection to FTP server process 55 in remote node 276. Receiver IP address is the IP address of Ethernet interface 51 on remote node 276. Sender port number is the port number corresponding to FTP client process 85. ACK number is the next byte that FTP client process 85 expects to receive, typically one plus the sequence number field of the segment being acknowledged. WINDOW is the amount of memory available for receiving data through the connection between FTP server process 55 and FTP client process 85. In this example, WINDOW is the amount of unallocated space in buffer 53 as shown in FIG. 4.

Figure 15:
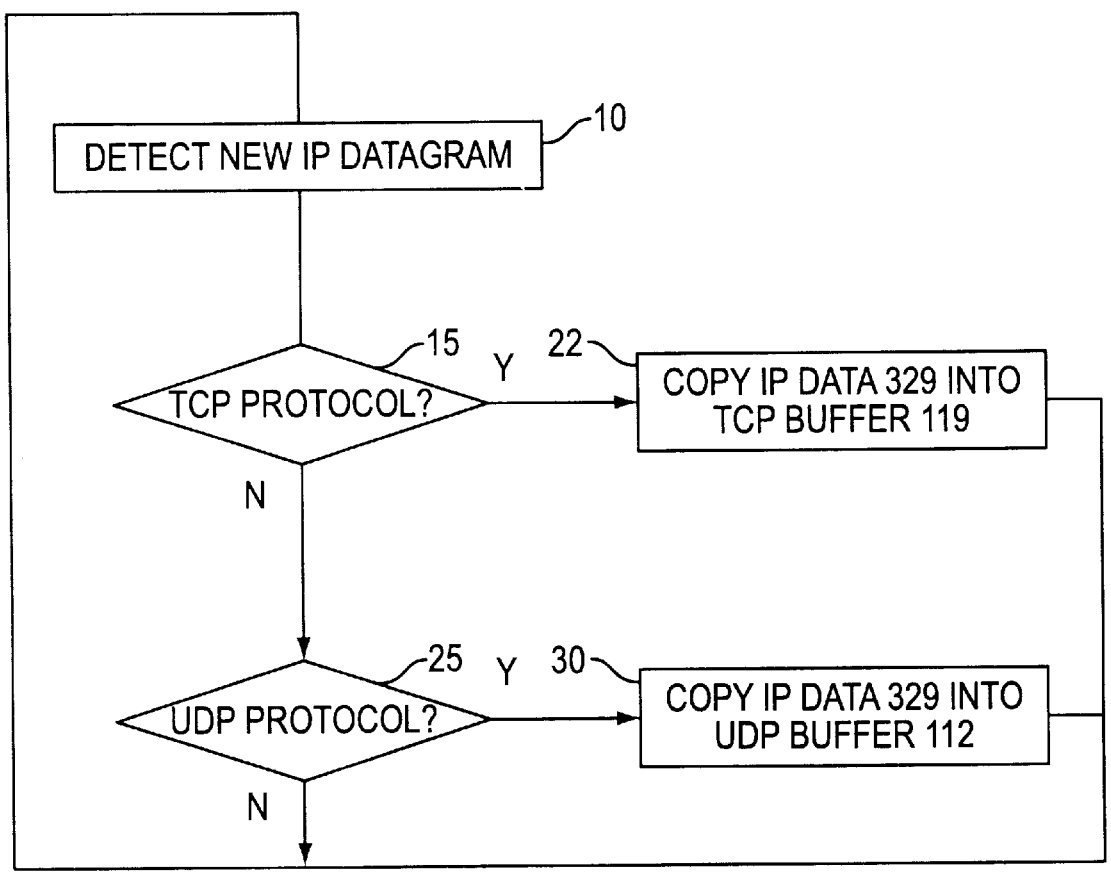
FIG. 15 is a procedural flow chart showing the processing performed by a first system process on the local node when the first process receives a datagram-embedded segment.

FIG. 15 (with references to FIGS. 6 through 8) shows the processing performed by IP process 96, after network card 2000 performs the DMA transfer of the datagram into RAM 15. IP process 96 detects the presence of a received IP datagram, by reading a semaphore set by a driver (not shown) for card 2000 (step 10). If protocol field 304 is equal to six (step 15), meaning that the IP data 329 contains a TCP segment. IP process 96 writes IP data 329 (the TCP segment) into TCP input buffer 119 (step 22). If protocol field 304 is equal to 17 (step 25), meaning that IP data 329 contains a UDP segment. IP process 96 writes IP data 329 (the UDP segment) into UDP input buffer 112 (step 30). Thus, IP process 96 acts to send the IP data area (the first data area) to the appropriate protocol process, depending on the IP protocol 304 field in the IP header (depending on a portion of the first header). By way of example only and not of limitation, IP process 96 might also route the IP data area to the Internet Control Message Protocol (ICMP) or to the Address Resolution Protocol (ARP).

Figure 16:
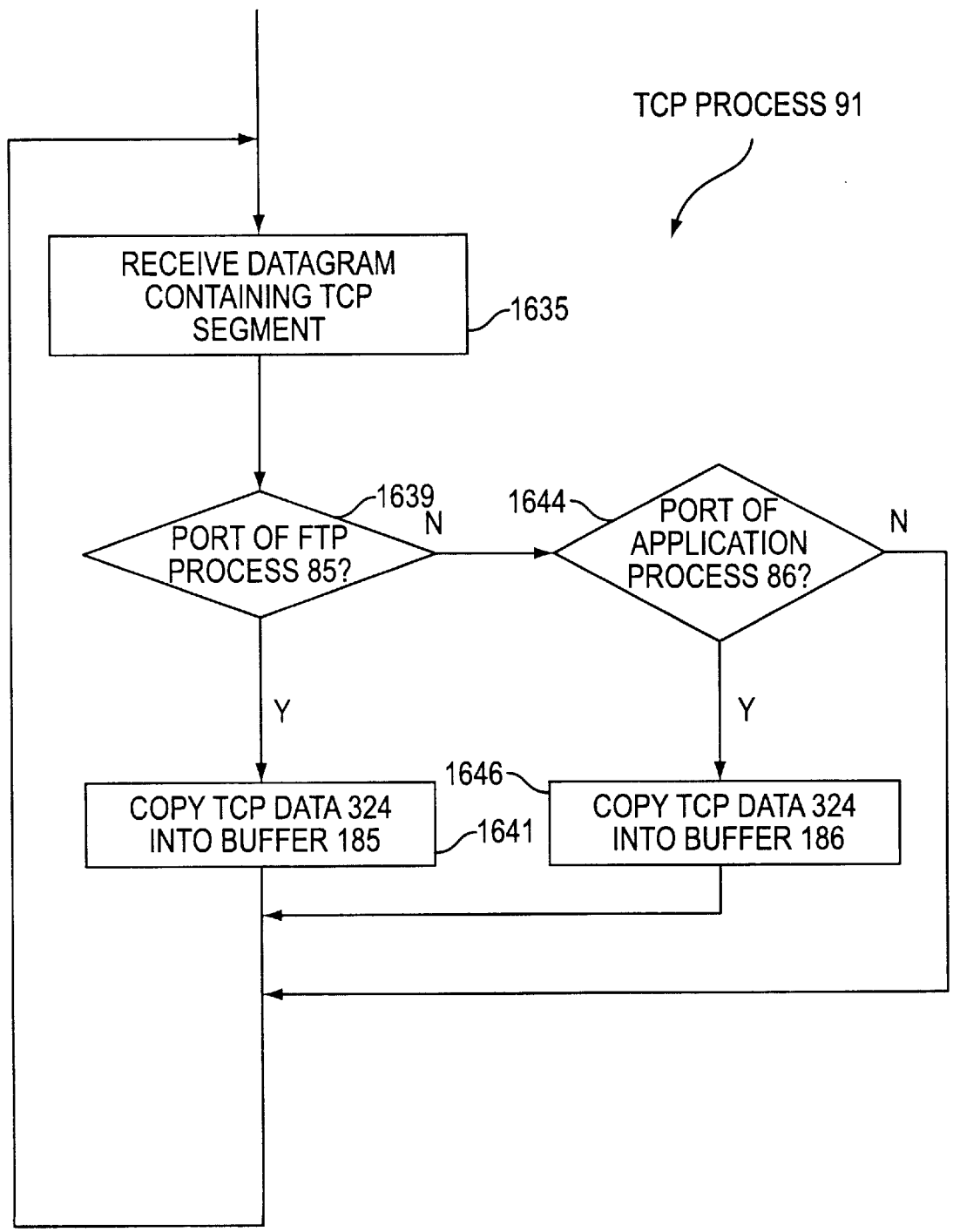
FIG. 16 is a procedural flow chart showing the processing performed by a second system process on the local node when the second process receives a segment.

FIG. 16 shows the processing performed by TCP process 91, to process a segment received in TCP input buffer 119 (step 1635). TCP process 91 determines whether the destination port field 312 is equal to the port of FTP client 85 (step 1639), and copies the TCP data area 324 into input buffer 185, for FTP client 85, if this equality exists (step 1641). Otherwise, if destination port field 312 is equal to the port of application process 86 (step 1644) TCP process 91 copies the TCP data field 324 to input buffer 186 for application process 86 (step 1646). Otherwise, TCP process 91 copies the TCP data field to an input buffer to the process corresponding to destination port field 312.

E. System processing—outgoing datagram The description of the system processing of an incoming datagram in the previous section includes the processing performed by local node 1000 as the researcher shown in FIG. 1 receives research information from the University in California. As the researcher receives this research information, the researcher is also sending research information to FTP server 55 on node 276 in California, via FTP client process 85 executing on local node 1000.

Figure 17A:
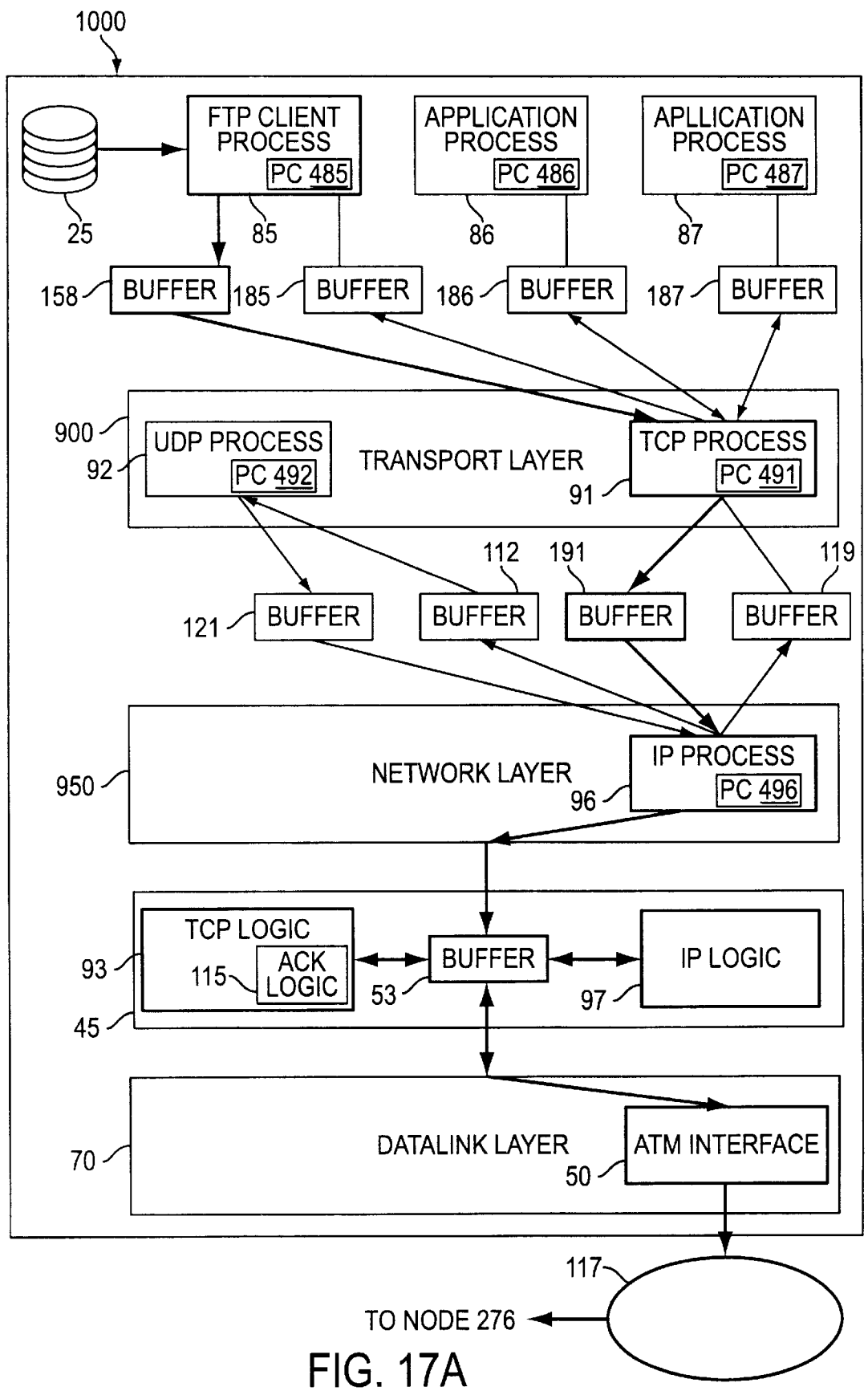
FIGS. 17A and 17B depict the path of a datagram from the local node being used by the researcher to the remote node at the university through the functional processes shown in the network architecture in FIGS. 2A and 2B.
Figure 17B:
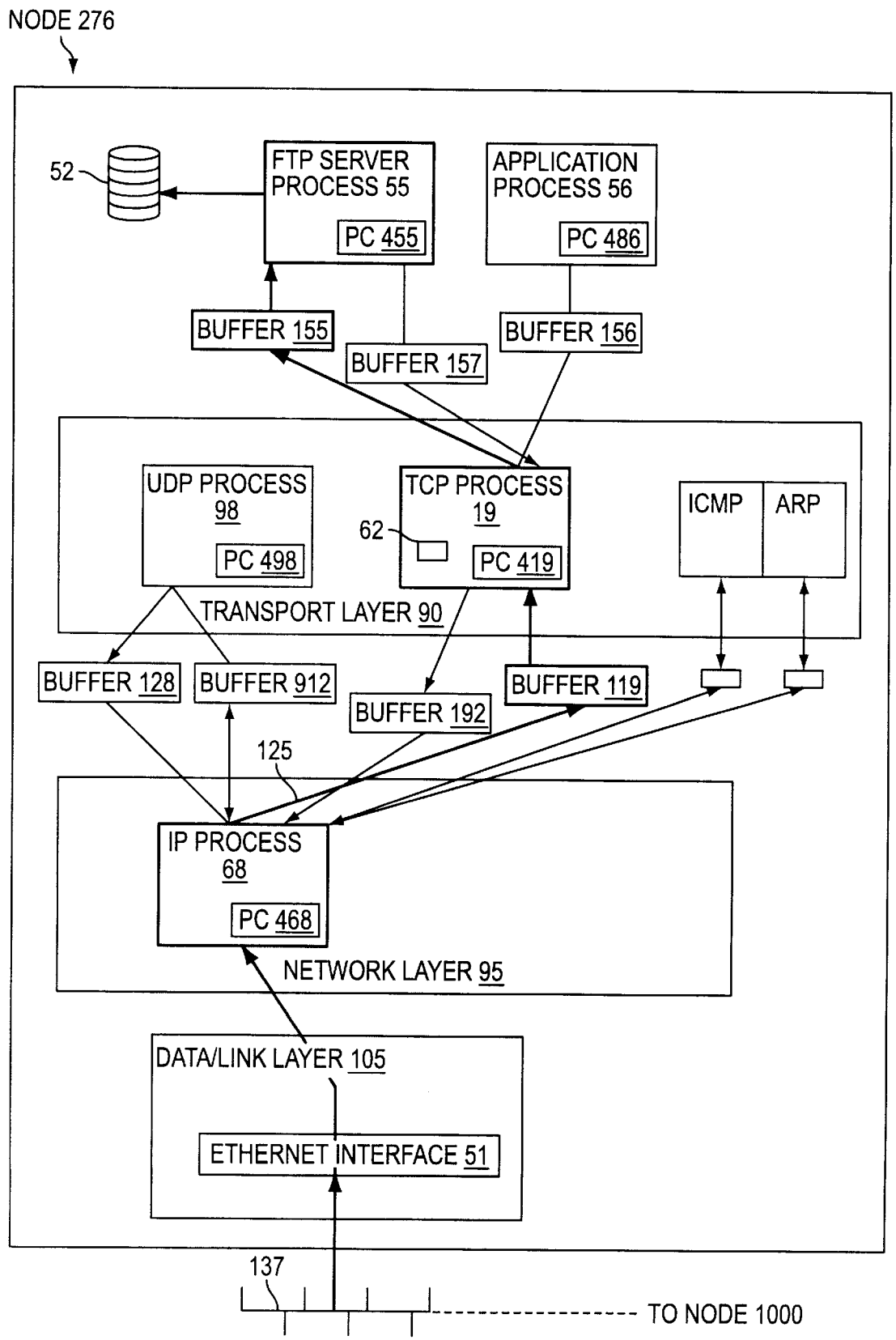

Referring to FIG. 17A and FIG. 17B, transport layer 900, network layer 950, and data link layer 70 in local node 1000 cooperate with transport layer 90, network layer 95, and data link layer 105 in remote node 276 to reliably send data from FTP client process 85 executing on local node 1000 to FTP server process 55 executing on remote node 276. Referring to FIG. 17A, local node 1000 generates an IP datagram via TCP process 91, buffer 191, IP process 96, and protocol logic subsystem 45. The datagram travels out of local node 1000 from buffer 53, to ATM interface 50, over ATM switches 117. Network 106, where remote node 276 resides, receives the datagram via Ethernet cable 137. Referring to FIG. 17B, the TCP segment travels from Ethernet cable 137 through Ethernet interface 51, and then up through the protocol stack consisting of IP process 68, buffer 119, TCP process 19, buffer 155, and finally to FTP server process 55.

More particularly, and referring back to the detailed hardware architecture of the preferred embodiment of network card 2000 in FIG. 4, bus interface circuitry 37 receives an outgoing datagram from PCI bus 30 and writes the outgoing datagram into datagram buffer 53. During this writing process, protocol logic subsystem 45 monitors bus 49 to sum selected words in the datagram being transferred to PCI bus 30 to buffer 53. Protocol logic subsystem 45 then completes the outgoing datagram, by setting the IP header checksum field and the TCP header checksum field based on the results of this summing process. Subsequently, ATM network interface chip 50 reads the completed datagram from buffer 53 and sends the datagram to ATM switches 117.

Figure 18A:
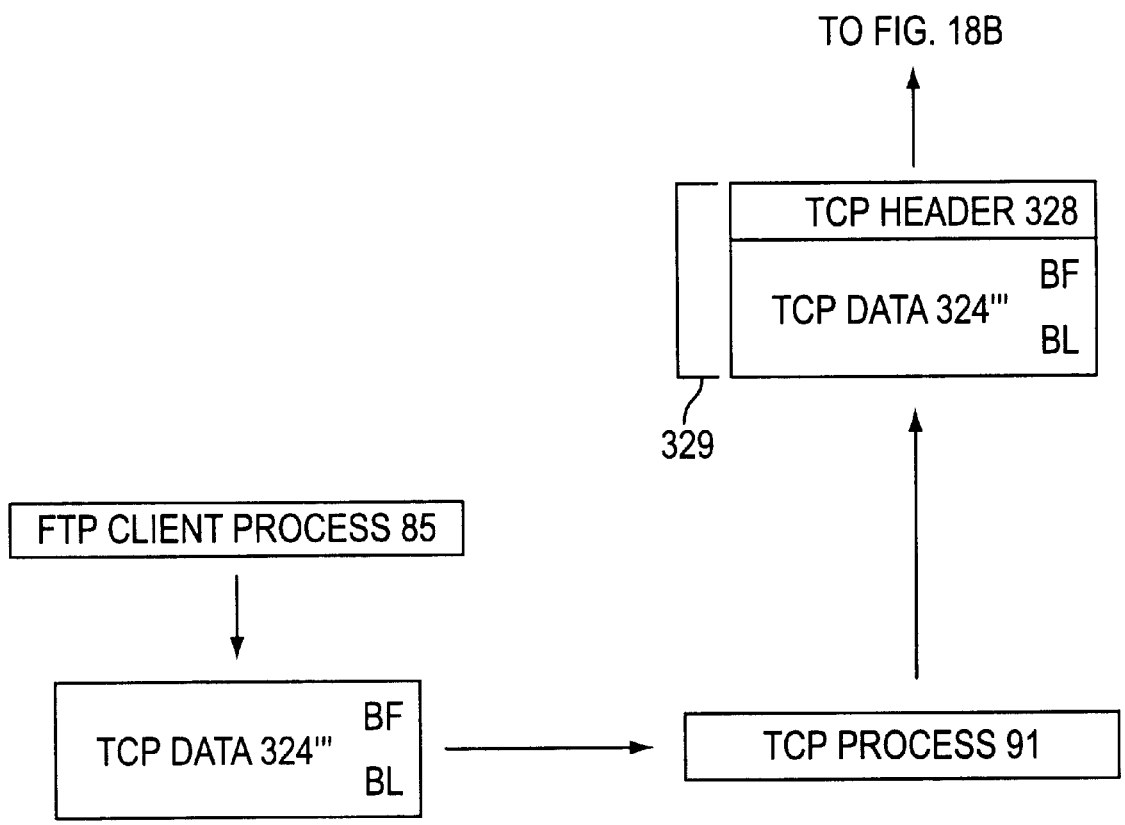
FIGS. 18A and 18B are data flow diagrams showing the data flow within the local node when an application process on local node sends a segment of information to an application process on the remote node.
Figure 18B:
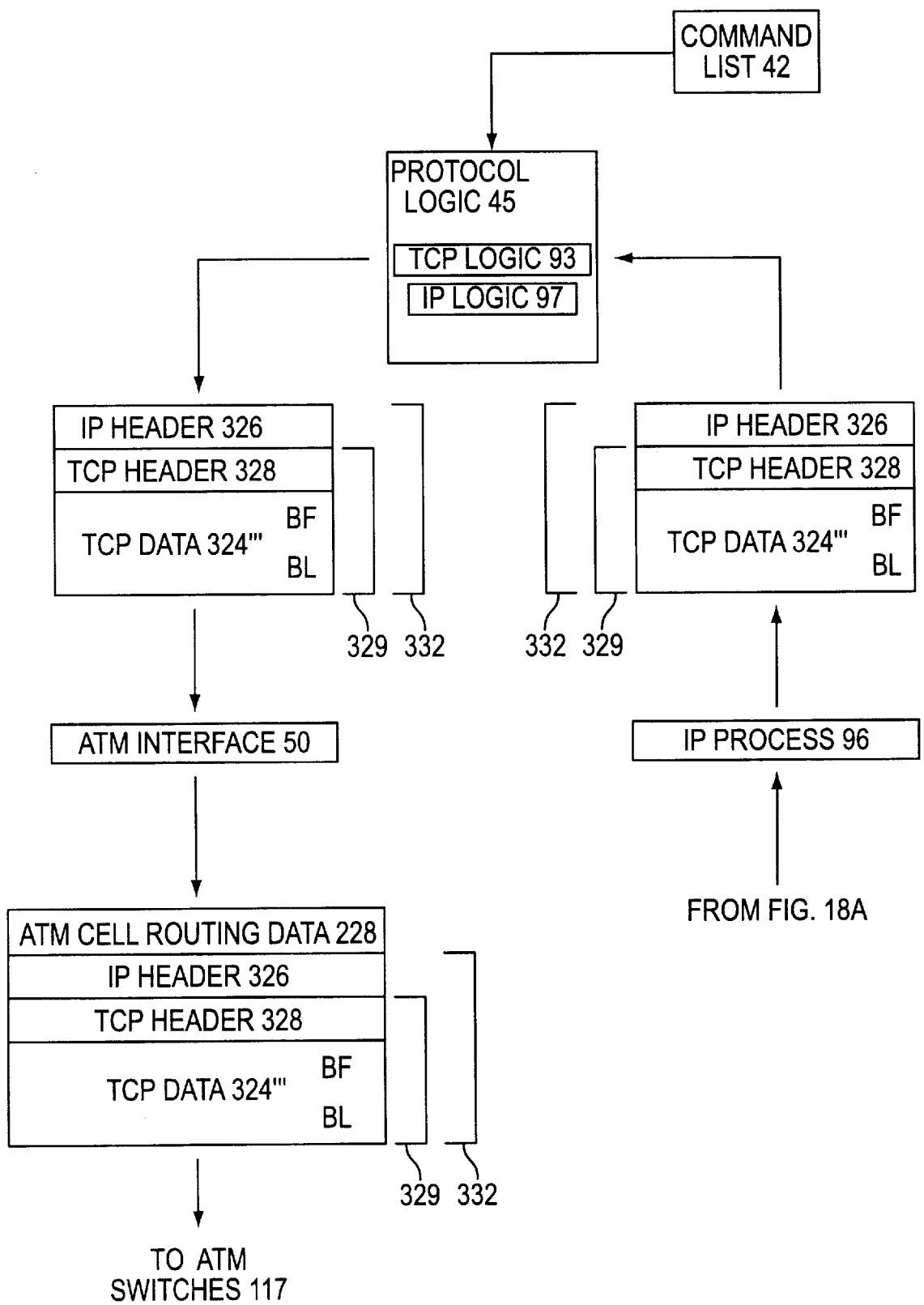

FIGS. 18A and 18B show the processing of a TCP segment sent from FTP client process 85 to FTP server process 55. The processing shown in FIGS. 18A and 18B, together with the processing of incoming TCP segments described above, constitutes a bi-directional (full duplex) flow of data between FTP server process 55 and FTP client process 85.

Thus, FIGS. 17A, 17B, 18A, and 18B, and the corresponding text describe a method of generating an IP datagram (an output signal) including an IP header (a first header) corresponding to node 276 in computer network 106, in the system of computer networks. The IP datagram also includes an IP data area (first data area). The IP data area includes TCP header 328 (a second header) having a destination field 312 corresponding to a FTP server process 55 on node 276. The IP data area also includes TCP data area 324 (a second data area).

Local node 1000 performs the steps of the preferred output generating method a plurality of times. Referring to FIGS. 18A and 18B, the method comprises the steps of generating an IP datagram (a first signal) using a first path, by constructing a TCP segment 329 in TCP process 91, sending the constructed TCP segment 329 to IP process 96 via buffer 191, and encapsulating the outgoing TCP segment 329 in IP process 96, to generate IP datagram 332-embedded TCP segment 329. Protocol logic subsystem 45 performs concurrent TCP and IP processing, receiving IP datagram 332 from IP process 96. In cooperation with ATM network interface chip 50, protocol logic subsystem 45 generates a signal for network 102 by appending ATM cell routing data 228 to datagram 332. ATM cell routing data 228 is essentially a third header corresponding to another node on network 102. ATM network interface chip 50 then sends the resulting signal over network 102.

TCP process 91 receives TCP data area 324''' from FTP client process 85. TCP process 91 encapsulates TCP data area 324''' with TCP header 328 to create TCP segment 329. TCP process sets checksum field 322, of header 328, to Zero. In other words, if TCP data area 324''' is considered a first signal and TCP header 328 is considered a second signal, TCP process 91 acts to append, the second signal to the first signal, thereby generating TCP segment 329 (a third signal). Because TCP header 328 includes destination port field 312 corresponding to process 55, this second signal corresponds to one of a plurality of processes executing on node 276.

TCP process 91 then sends TCP segment 329 to IP process 96. IP process 96 encapsulates TCP segment 329 with IP header 326 and sets the IP header checksum field 303 to zero to generate IP datagram 332. In other words, if IP header 326 is considered a fourth signal, IP process 96 acts to append the fourth signal to the third signal, to generate IP datagram 332 (a fifth signal). Because IP header 326 contains destination IP address field 308, this fourth signal corresponds to local node 1000. This fifth signal has a first position corresponding to TCP header 328 (the second signal) and a second position corresponding to TCP segment 329 (the third signal).

Referring back to the hardware architecture of local node 1000 depicted in FIGS. 3 and 4, CPU 10 and the instructions of TCP process 91 and IP process 96 constitute a first processor having circuitry for generating a partial IP datagram (a first signal). This first processor includes circuitry for sending the bus address of RAM card 114 to the address lines of PCI bus 30, and circuitry for sending the first signal to the data lines of PCI bus 30. The partial IP datagram (first signal) includes a value for IP destination IP address field 308 of IP header 326 and includes values in TCP data area 324. This first signal is only a partial datagram, however, because it lacks a correct value for TCP checksum field 322 of TCP header 328 and the IP checksum field 303 of IP header 326.

The circuitry on network card 2000 includes the protocol logic subsystem 45, which constitutes a second processor in the preferred embodiment. This subsystem includes circuitry, coupled to the address lines of bus 30, for recognizing a respective bus address for the protocol logic subsystem 45, circuitry for receiving the first signal from the data lines of bus 30, checksum circuitry for generating a complete IP datagram-embedded TCP segment (the network signal) by processing the first signal, and circuitry for generating the appropriate network signal for sending to network 102.

Protocol logic subsystem 45, in cooperation with ATM network interface chip 50. Generates a packet for network 102 in response to receiving a signal from a first data path including TCP process 91, buffer 191, and IP process 96. Protocol logic subsystem 45, in cooperation with ATM network interface chip 50 also generates a packet for network 102 in response to receiving a second signal from a second data path comprising protocol logic 45, or alternatively, TCP process 91, and command list 42. The step of generating the ACK command (the second signal) for command list 42 includes receiving a complete and uncorrupted datagram-embedded TCP segment from network 102.

Figure 19:
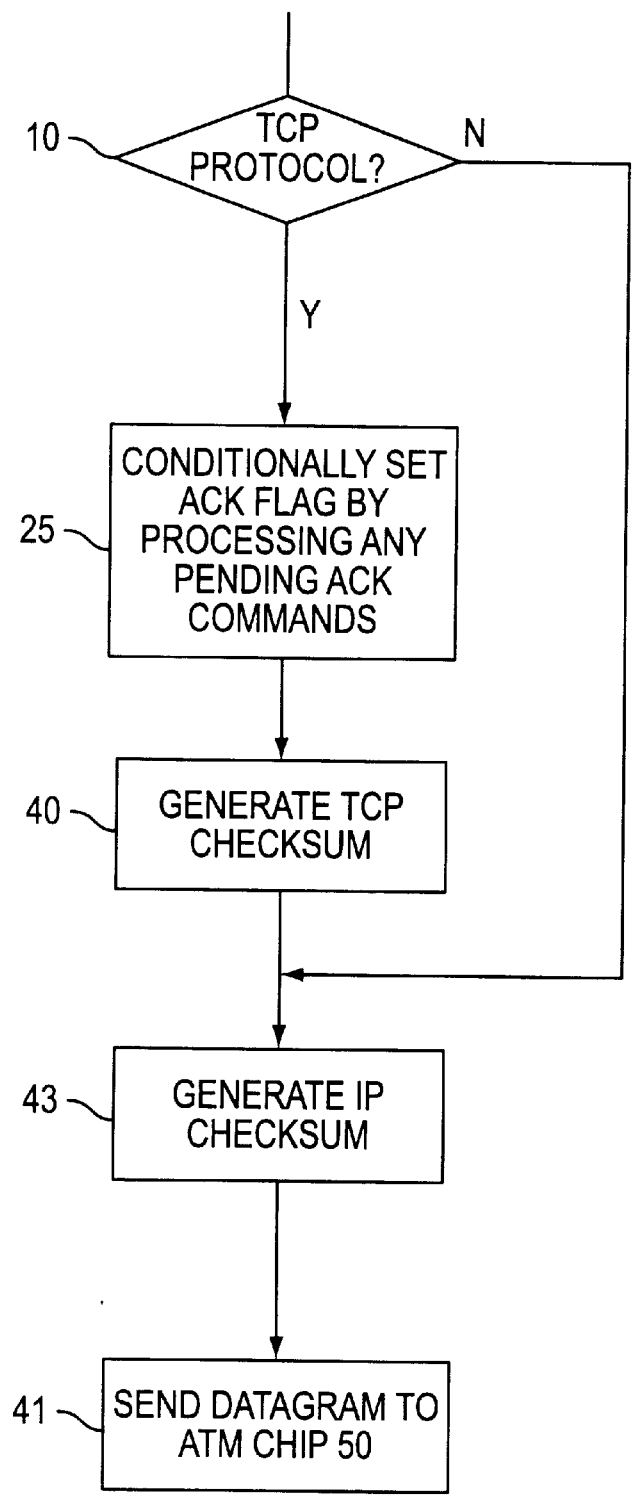
FIG. 19 is a procedural flow chart showing the processing performed by the network card in the local node when the process in the local node sends the outgoing segment.

FIG. 19 shows the processing performed by protocol logic subsystem 45, on network card 2000, in response to receiving IP datagramn 332 from IP process 96, via a driver software (not shown) in datalink layer 70. Protocol logic subsystem 45 determines whether datagram 332 encapsulates a TCP segment, by determining whether protocol field 304 is equal to 6 (step 10) and passes control to step 43 if protocol field 304 is not equal to 6.

Protocol logic subsystem 45 generates the TCP checksum and sets TCP checksum field 322 equal to the value of the generated TCP checksum: the one's complement of the sum of each if the remaining 16-bit words in TCP header 328, each 16-bit word in TCP data area 324, and the six 16-bit words in the pseudo-header shows in FIG. 8 and described in RFC 793 (step 40).

In step 43, protocol logic subsystem 45 generates the IP checksum and sets IP checksum field 303 equal to the value of the generated IP checksum: the one's compliment sum of the remaining 16-bit words in IP header 326, as described in RFC 791. Protocol logic subsystem 45 then sends datagram 332 to ATM network interface chip 50, which sends datagram 332 to network 102 (step 41).

Figure 20:
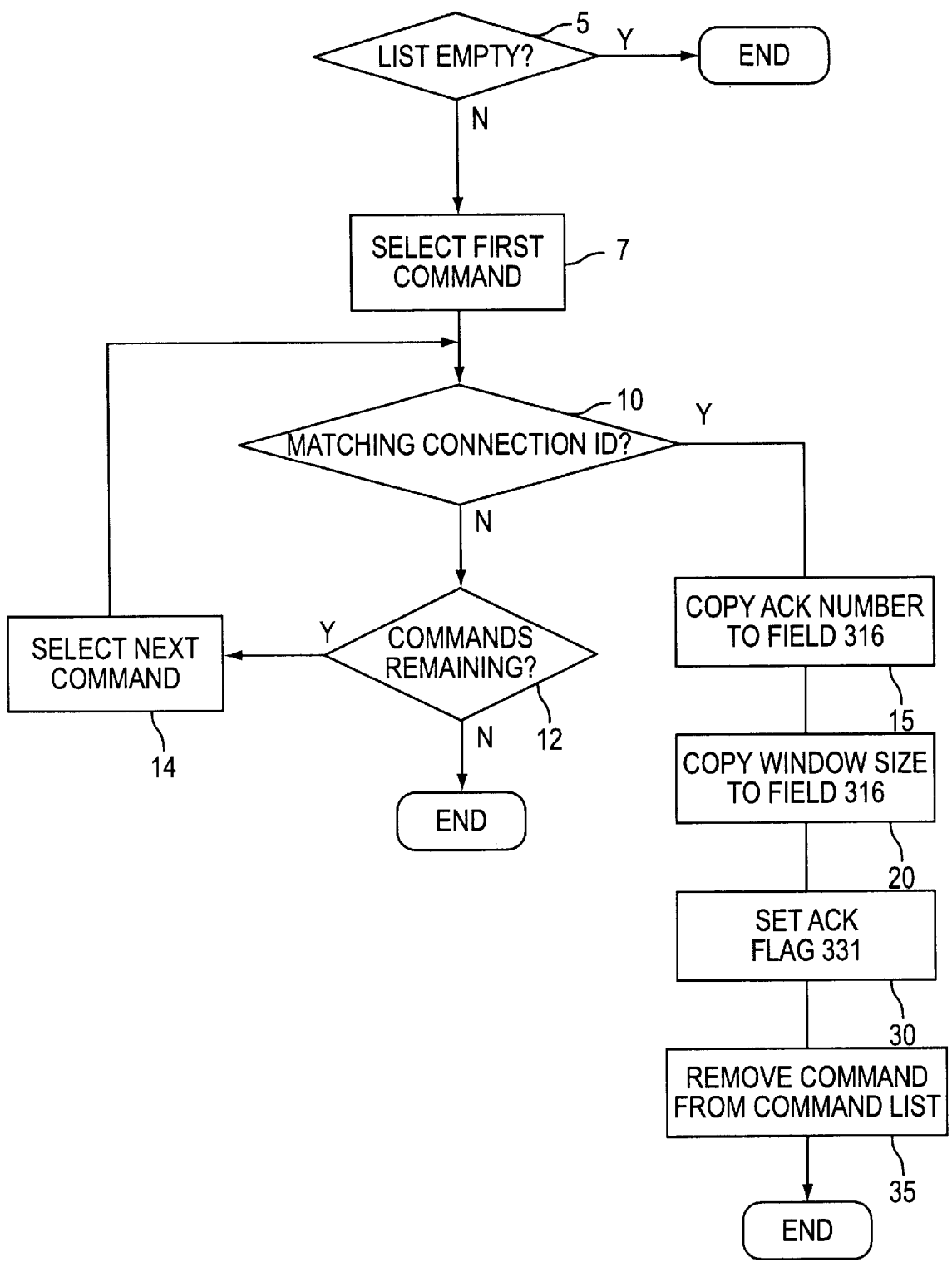
FIG. 20 is a flow chart showing a step of the processing of FIG. 15 in more detail.

FIG. 20 shows the processing of step 25 of FIG. 19 in more detail. Protocol logic subsystem 45 on network card 2000 determines whether command list 42 is empty (step 5) and selects the first command in list 42 if the list is not empty (step 7). Protocol logic subsystem 45 determines whether the connection identifier (ID) of the current command in list 42 matches the connection identifier for the currently processed datagram (step 10). (In this patent application, the term connection identifier includes three quantities: receiver port number, receiver IP address, and sender port number.)

If the connection ID does not match, protocol logic subsystem 45 selects any remaining commands in list 42 (steps 12 and 14), determines whether there are commands remaining in list 42 (step 14), and passes control back to step 10. If step 10 detects a matching connection ID, protocol logic subsystem 45 copies the acknowledgment number in the command to TCP header field 316 in datagram 332 (step 15), copies the window field of the command to TCP header field 320 of datagram 332 (step 20), and sets ACK flag 331 in datagram 332 (step 30).

Protocol logic subsystem 45 then deletes the command from command list 42 (step 35). Thus, the processing of FIG. 20 acts to piggyback an ACK onto a transmitted segment, as suggested in RFC 793.

FIG. 18B depicts an alternate path for generating the signal for network 102. Responsive to the expiration of a timer (not shown) in the protocol logic subsystem 45, the protocol logic subsystem 45 reads an ACK command from command list 42 and generates an IP datagram 332-embedded TCP segment 329 containing the ACK. Subsequently, protocol logic subsystem 45, in cooperation with ATM network interface chip 50, prepends ATM cell routing data 228 to the datagram and sends the resulting signal over network 102, in the same manner as was performed for the datagram generated by TCP process 91 and IP process 96. This process repeats until all the ACK commands in the command list 42 have been processed.

Figure 21:
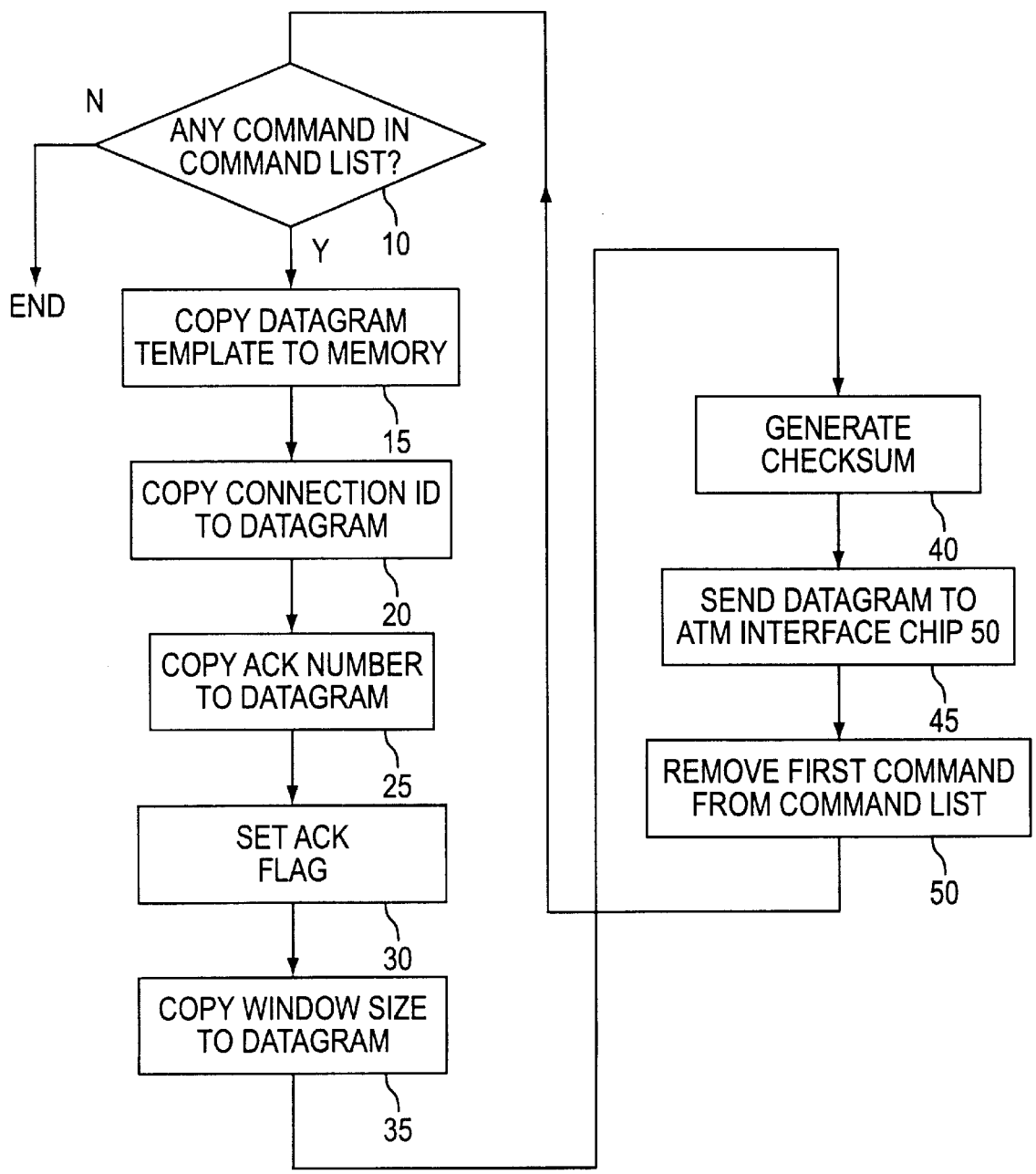
FIG. 21 is a procedural flow chart showing a process periodically performed by the network card on the local node.

Network card 2000 also includes a clock for generating a timing signal. This clock expires every 200 milliseconds, causing card 2000 to process any pending ACK commands, thereby independently generating TCP ACK segments, regardless of whether there is an outgoing datagram from process 85 to process 55. FIG. 21 shows this processing performed by protocol logic subsystem 45 upon expiration of this clock. Protocol logic subsystem 45 determines whether there are ACK commands in command list 42 (step 10). If there are ACK commands in command list 42, protocol logic subsystem 45 constructs a datagram-embedded TCP segment by first copying a datagram template to a temporary memory area. This datagram template has the sender IP address preset, since the IP address of ATM network interface chip 50 is fixed (step 15). Protocol logic subsystem 45 then copies the connection identification from the first command in list 42 to the datagram under construction, by copying a receiver port in the command to destination port field 312 in the TCP header, copying the receiver IP address in the command to destination IP address field 308, copying the send port number in the command to source port field 310, protocol logic subsystem 45 copies the acknowledgment number in the command to acknowledgment number field 316 in the TCP header (step 25), and sets acknowledgment flag 331 in the TCP header (step 30). Protocol logic subsystem 45 copies the window in the command to window field 321 (step 35). Protocol logic subsystem 45 generates the TCP checksum, as described above, and sets the checksum field 322 with the value of the generated checksum (step 40). Simultaneously, protocol logic subsystem 45 generates the IP header checksum, as described above, and sets the checksum field 303 with the value generated. Protocol logic subsystem 45 then sends the datagram to ATM network interface chip 50 (step 45) and deletes the first command from the list (step 50). This process repeats until all the ACK commands in the command list 42 have been processed.

The invention has been described in detail with particular reference to the preferred embodiment thereof, but it will be understood that variations and modifications can be effected within the spirit and scope of the invention as described hereinabove and as defined in the appended claims.

What is claimed is:

1. A method of reliably receiving TCP/IP datagrams in a local node on one computer network from a remote node on another computer network comprising the steps of:

receiving a datalink layer message from a physical medium into a buffer in a datalink layer protocol interface on a network interface card;

removing a datalink routing header from said datalink layer message to create an IP datagram;

forwarding said IP datagram to a buffer in a communications protocol logic running on said network interface card;

calculating, on said network interface card, a first checksum over selected portions of the IP datagram;

simultaneously with calculating said first checksum, calculating, on said network interface card, a second check sum over selected portions of an IP data area;

forwarding said IP datagram to a network layer protocol;

removing an IP header from said IP datagram to create an IP data area;

forwarding said IP data area to at least one of a plurality of buffers between said network layer protocol and a transport layer protocol;

removing a transport layer header from said IP data area in one of said plurality of buffers between said network layer protocol and said transport layer protocol to create a data message;

forwarding, based on data in said transport layer header, said data message to at least one of a plurality of buffers between said transport layer and a plurality of application processes;

forwarding said data message to one of said application processes.

2. The method according to claim 1, further comprising the steps of:

verifying said first checksum; and suppressing further processing based on verification of said first checksum.

3. The method according to claim 1, wherein said forwarding said IP datagram to a network layer protocol step further comprises the steps of:

verifying said second checksum; and suppressing all further processing based on verification of said second checksum.

4. The method according to claim 1, wherein said forwarding said IP datagram to a network layer protocol step further comprises the steps of:

verifying said second checksum; and suppressing all further processing based on verification of said second checksum.

5. The method according to claim 1, for further reliably constructing a synchronous acknowledgement to at least one received datagram, further comprising the step of generating a datagram that contains said acknowledgement as the data on said network interface card.

6. The method according to claim 5, wherein said acknowledgement is transmitted in response to an expiration of a timer in protocol logic on said network interface card.

7. The method according to claim 1, for further reliably constructing a synchronous acknowledgement to at least one received datagram, further comprising the step of generating a datagram that contains said acknowledgement embedded in one of the transport layer header and the IP header on said network interface card.

8. The method according to claim 7, wherein synchronous acknowledgement is suppressed by logic implemented in a network processor on said network interface card.

9. The method according to claim 7, wherein said acknowledgement is transmitted in response to an expiration of a timer in protocol logic on said network interface card.

10. The method according to claim 1, for further reliably constructing an asynchronous acknowledgement to at least one received datagram, further comprising the step of generating a datagram that contains said acknowledgement as the data on said network interface card.

11. The method according to claim 10, wherein asynchronous acknowledgement is suppressed by logic implemented in a network processor on said network interface card.

12. The method according to claim 10, wherein said acknowledgement is transmitted in response to an expiration of a timer in protocol logic on said network interface card.

13. The method according to claim 1, for further reliably constructing an asynchronous acknowledgement to at least one received datagram, further comprising the step of generating a datagram that contains said acknowledgement embedded in one of the transport layer header and the IP header on said network interface card.

14. The method according to claim 13, wherein said acknowledgement is transmitted in response to an expiration of a timer in protocol logic on said network interface card.

15. The method according to claim 13, wherein said acknowledgement is suppressed by logic implemented in a network processor on said network interface card.

16. The method according to claim 1, wherein said protocol logic is reconfigurable.

17. The method according to claim 16, wherein asynchronous acknowledgement is suppressed by logic implemented in a network processor on said network interface card.

18. A method of reliably receiving TCP/IP datagrams in a local node on one computer network from a remote node on another computer network comprising the steps of:

receiving a datalink layer message from a physical medium into a buffer in a datalink layer protocol interface on a network interface card;

removing a datalink routing header from said datalink layer message to create an IP datagram;

forwarding said IP datagram to a buffer in a communications protocol logic running on said network interface card;

calculating, on said network card, a first checksum over selected portions of the IP datagram;

determining from an IP header on said IP datagram, whether said IP datagram is one fragment of a larger IP datagram;

conditionally storing a data area of said IP datagram in memory on said network card based on results of said determining step and a fragment offset indicated in said IP header;

additionally storing said IP header to memory to create a reassembled IP datagram if said IP datagram is a first fragment in said larger IP datagram;

forwarding said reassembled IP datagram from said memory on said network card to a network layer protocol if said IP datagram is a last missing fragment of said larger IP datagram;

removing from said reassembled IP datagram the IP header to create an IP data area;

forwarding said IP data area to at least one of a plurality of buffers between said network layer protocol and a transport layer protocol;

removing from said IP data area in one of said plurality of buffers between said network layer protocol and said transport layer protocol a transport layer header to create a data message;

forwarding said data message to at least one of a plurality of buffers between said transport layer and an application process;

forwarding said data message to said application process.

19. The method according to claim 18, further comprising the steps of:

verifying said first checksum; and suppressing further processing based on verification of said first checksum.

20. The method according to claim 18, wherein said forwarding said reassembled IP datagram to a network layer protocol step further comprises the steps of:

verifying said second checksum; and suppressing further processing based on verification of said first checksum.

21. The method according to claim 18, wherein said forwarding said reassembled IP datagram to a network layer protocol step further comprises the steps of:

verifying said second checksum; and suppressing further processing based on verification of said first checksum.

22. The method according to claim 18, for further reliably constructing a synchronous acknowledgement to at least one received datagram, further comprising the step of generating a datagram that contains said acknowledgement as the data on said network interface card.

23. The method according to claim 22, wherein said acknowledgement is transmitted in response to an expiration of a timer in protocol logic on said network interface card.

24. The method according to claim 22, wherein synchronous acknowledgement is suppressed by logic implemented in a network processor on said network interface card.

25. The method according to claim 18, for further reliably constructing a synchronous acknowledgement to at least one received datagram, further comprising the step of generating a datagram that contains said acknowledgement embedded in one of the transport layer header and the IP header on said network interface card.

26. The method according to claim 25, wherein synchronous acknowledgement is suppressed by logic implemented in a network processor on said network interface card.

27. The method according to claim 25, wherein said acknowledgement is transmitted in response to an expiration of a timer in protocol logic on said network interface card.

28. The method according to claim 18, for further reliably constructing an asynchronous acknowledgement to at least one received datagram, further comprising the step of generating a datagram that contains said acknowledgement as the data on said network interface card.

29. The method according to claim 28, wherein asynchronous acknowledgement is suppressed by logic implemented in a network processor on said network interface card.

30. The method according to claim 28, wherein said acknowledgement is transmitted in response to an expiration of a timer in protocol logic on said network interface card.

31. The method according to claim 18, for further reliably constructing an asynchronous acknowledgement to at least one received datagram, further comprising the step of generating a datagram that contains said acknowledgement embedded in one of the transport layer header and the IP header on said network interface card.

32. The method according to claim 31, wherein said acknowledgement is transmitted in response to an expiration of a timer in protocol logic on said network interface card.

33. The method to claim 31, wherein asynchronous acknowledgement is suppressed by logic implemented in a network processor on said network interface card.

34. The method according to claim 18, wherein said protocol logic is reconfigurable.

35. In a system having a plurality of computer networks, each network having a plurality of nodes, and selected ones of said nodes having a processing subsystem, the processing subsystem comprising:

a mechanical backplane, said mechanical backplane further comprising a plurality of parallel conductors for connecting and electrically coupling a PCI bus to bus interface circuitry;

RAM memory connected to said mechanical backplane;

a disk controller card connected to said mechanical backplane;

an AC to DC converter connected to said mechanical backplane;

a processor connected to said mechanical backplane;

a network processing subsystem connected to said mechanical backplane;

said bus interface circuitry residing in each of said RAM memory, said disk controller card, said processor, and said network processing subsystem;

said bus interface circuitry recognizes a bus address of a unit in which it resides;

said network processing subsystem further comprises:

an ATM interface unit connected and electrically coupled to ATM switches;

protocol logic further comprising:

inbound protocol logic connected and electrically coupled to said ATM interface unit, said inbound protocol logic further connected and electrically coupled to a first memory unit;

outbound protocol logic connected and electrically coupled to said ATM interface unit, said outbound protocol logic further connected and electrically coupled to a second memory unit, said outbound protocol logic further connected and electrically coupled to said inbound protocol logic;

a bridging means connected and electrically coupled to said bus interface circuitry, said bridging means further connected and electrically coupled connected and electrically coupled to said protocol logic;

said processor and said network processing subsystem combine to implement an entire TCP/IP protocol suite within said processing subsystem;

said inbound protocol logic implements a portion of the TCP protocol and a portion of the IP protocol for processing received datagrams; and said outbound protocol logic implements a portion of the TCP protocol and a portion of the IP protocol for processing datagrams for transmission.

36. The system according to claim 35, wherein:

said first memory unit acts as a buffer for received datagrams requiring further processing by said inbound protocol logic;

said second memory unit acts as a buffer for datagrams to be transmitted requiring further processing by said outbound protocol logic; and said second memory unit further acting as a buffer for TCP acknowledgment commands.

37. The processing subsystem according to claim 35, wherein said network inbound protocol logic and said outbound protocol are reocnfigurable.

38. The processing subsystem according to claim 35, wherein said network procissing subsystem verifies that both a TCP segment checksum and an IP header checksum are correct before forwarding a received datagram to said processor for further processing.

39. The processing subsystem according to claim 38, wherein said network processing subsystem generates an ackowledgment once the data has been verified by the checksums.

40. The processing subsystem according to claim 38, wherein said network processing subsystem embeds an acknowledgment in one of a TCP header and and IP header of an outbound datagram.

41. The processing subsystem according to claim 35, wherein said network processing sybsystem further accomplishes reassembly of a plurality of inbound datagrams and further verifies that partial checksums of the inbound datagrams yield a verified total checksum of reassembled inbound datagrams.

42. The processing subsystem according to claim 41, wherein said network processing subsystem further buffers inbound datagrams received out of order.

43. The processing subsystem according to claim 35, wherein said network processing subsystem suppresses sending of a datagram until an acknowledgment is reveived.

44. The processing subsystem according to claim 35, wherein said network processing subsystem removes a TCP header adn an IP header from received datagrams before sending said received datagrams on to said processor for further processing.

45. The processing subsystem according to claim 35, wherein said network processing subsystem suppresses generation and transmissin of an acknowledgment.

46. The processing subsystem according to claim 35, wherein said inbound protocol logic and said outbound protocol logic are co-located in the same physical device.

47. The processing subsystem according to claim 35, wherein said first memory unit and said second memory unit are portions of the same physical memory device.

48. In a system having a plurality of computer networks, each network having a plurality of nodes, and selected ones of said nodes having a processing subsystem, the processing subsystem comprising:

a mechanical backplane, said mechanical backplane further comprising a plurality of parallel conductors for connecting and electrically coupling a PCI bus to bus interface circuitry;

RAM memory connected to said mechanical backplane;

a disk controller card connected to said mechanical backplane;

an AC to DC converter connected to said mechanical backplane;

a processor connected to said mechanical backplane;

a network processing subsystem connected to said mechanical backplane;

said bus interface circuitry residing in each of said RAM memory, said disk controller card, said processor, and said network processing subsystem;

said bus interface circuitry recognizes a bus address of a unit in which it resides;

said network processing subsystem further comprises:

an WAN interface unit connected and electrically coupled to WAN switches;

protocol logic further comprising:

inbound protocol logic connected and electrically coupled to said WAN interface unit, said inbound protocol logic further connected and electrically coupled to a first memory unit;

outbound protocol logic connected and electrically coupled to said WAN interface unit, said outbound protocol logic further connected and electrically coupled to a second memory unit, said outbound protocol logic further connected and electrically coupled to said inbound protocol logic;

a bridging means connected and electrically coupled to said bus interface circuitry, said bridging means further connected and electrically coupled connected and electrically coupled to said protocol logic;

said processor and said network processing subsystem combine to implement the entire TCP/IP protocol suite within said processing subsystem;

said inbound protocol logic implements a portion of the TCP protocol and a portion of the IP protocol for processing received datagrams; and said outbound protocol logic implements a portion of the TCP protocol and a portion of the IP protocol for processing datagrams for transmission.

49. The system according to claim 48, wherein:

said first memory unit acts as a buffer for received datagrams requiring further processing by said inbound protocol logic;

said second memory unit acts as a buffer for datagrams to be transmitted requiring further processing by said outbound protocol logic; and said second memory unit further acting as a buffer for TCP acknowledgment commands.

50. The processing subsystem according to claim 48, wherein said inbound protocol logic and said outbound protocol logic are reconfigurable.

51. The processing subsystem according to claim 50, wherein said network processing subsystem generates an acknowledgment once the data has been verified by the checksums.

52. The processing subsystem according to claim 50, wherein said network processing subsystem embeds an acknowledgment in one of a TCP header and an IP header of an outbound datagram.

53. The processing subsystem according to claim 52, wherein said network processing subsystem further buffers inbound datagrams received out of order.

54. The processing subsystem according to claim 48, wherein said network processing subsystem verifies that both a TCP segment checksum and an IP header checksum are correct before forwarding a received datagram to said processor for further processing.

55. The processing subsystem according to claim 48, wherein the network processing subsystem further accomplishes reassembly of a plurality of inbound datagrams and further verifies that partial checksums of the inbound datagrams yield a verified total checksum of reassembled inbound datagrams.

56. The processing subsystem according to claim 48, wherein said network processing subsystem suppresses sending of a datagram until an acknowledgment is received.

57. The processing subsystem according to claim 48, wherein said network processing subsystem removes a TCP header and an IP header from received datagrams before sending said received datagrams on to said processor for further processing.

58. The processing subsystem according to claim 48, wherein said network protocol subsystem suppresses generation and transmission of an acknowledgment.

59. The processing subsystem according to claim 48, wherein said inbound protocol logic and said outbound protocol logic are co-located in the same physical device.

60. The processing subsystem according to claim 48, wherein said first memory unit and said second memory unit are portions of the same physical memory device.

* * * * *